(12) United States Patent
Kim et al.

(10) Patent No.: US 9,549,399 B2
(45) Date of Patent: Jan. 17, 2017

(54) METHOD AND APPARATUS FOR MONITORING DOWNLINK CONTROL CHANNEL

(71) Applicant: LG ELECTRONICS INC., Seoul (KR)

(72) Inventors: Hakseong Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 122 days.

(21) Appl. No.: 14/403,489

(22) PCT Filed: May 27, 2013

(86) PCT No.: PCT/KR2013/004611
§ 371 (c)(1),
(2) Date: Nov. 24, 2014

(87) PCT Pub. No.: WO2013/176530
PCT Pub. Date: Nov. 28, 2013

(65) Prior Publication Data
US 2015/0117356 A1   Apr. 30, 2015

Related U.S. Application Data

(60) Provisional application No. 61/651,558, filed on May 25, 2012, provisional application No. 61/662,320, (Continued)

(51) Int. Cl.
*H04B 7/26* (2006.01)
*H04W 72/04* (2009.01)
(Continued)

(52) U.S. Cl.
CPC ......... *H04W 72/042* (2013.01); *H04B 7/2656* (2013.01); *H04J 11/0069* (2013.01);
(Continued)

(58) Field of Classification Search
CPC ...... H04L 5/0094; H04L 5/001; H04L 1/1861; H04L 27/2607; H04L 5/0007; H04L 5/0023; H04L 5/0039; H04L 5/0041; H04L 5/0092; H04L 5/0053; H04W 72/042; H04W 24/02; H04W 48/12; H04W 72/0406; H04W 72/12; H04W 48/16; H04W 24/08; H04W 72/04; H04W 72/1278; H04W 72/1289; H04J 11/0069
See application file for complete search history.

(56) References Cited

U.S. PATENT DOCUMENTS 8,401,542 B2 * 3/2013 Chung ................. H04L 5/0007
370/485
8,606,286 B2 * 12/2013 Vrzic .................... H04L 5/0053
370/329
(Continued)

FOREIGN PATENT DOCUMENTS

JP    2012-85047 A    4/2012
KR   10-2010-0038852 A    4/2010

OTHER PUBLICATIONS

Renesas Mobile Europe Ltd., "PDCCH performance results for eICIC", 3GPP TSG-RAN WG4 Meeting #59AH, R4-113698, Bucharest, Romania, Jun. 27, 2011-Jul. 1, 2011, (http://www.3gpp.org/ftp/tsg_ran/WG4_Radio/TSGR4_59AH/docs/), See p. 6, line 23—p. 7, line 3.
(Continued)

*Primary Examiner* — Ahmed Elallam
(74) *Attorney, Agent, or Firm* — Birch, Stewart, Kolasch & Birch, LLP

(57) ABSTRACT

Provided are a method and an apparatus for monitoring a control channel in a wireless communication system. A wireless device receives indicative information for indicating a search space for a downlink control channel through an
(Continued)

indication channel, and monitors the downlink control channel in the search space. The search space is defined by one or more pairs of physical resource blocks (PRBs).

5 Claims, 31 Drawing Sheets

Related U.S. Application Data filed on Jun. 20, 2012, provisional application No. 61/679,081, filed on Aug. 3, 2012.

(51) Int. Cl.
- *H04J 11/00* (2006.01)
- *H04L 1/00* (2006.01)
- *H04L 5/00* (2006.01)

(52) U.S. Cl.
CPC .......... *H04L 1/0046* (2013.01); *H04L 1/0072* (2013.01); *H04L 5/00* (2013.01)

(56) References Cited

U.S. PATENT DOCUMENTS

| | | | |
|---|---|---|---|
| 2011/0317645 A1 | 12/2011 | Jen | |
| 2013/0039284 A1* | 2/2013 | Marinier | H04L 5/001 370/329 |
| 2013/0064196 A1* | 3/2013 | Gao | H04L 5/0016 370/329 |
| 2013/0183987 A1* | 7/2013 | Vrzic | H04L 1/0046 455/450 |
| 2013/0194931 A1* | 8/2013 | Lee | H04L 5/0053 370/241 |
| 2013/0194956 A1* | 8/2013 | Sartori | H04W 24/02 370/252 |
| 2013/0195020 A1* | 8/2013 | Frederiksen | H04W 72/042 370/329 |
| 2013/0195067 A1* | 8/2013 | Khoshnevis | H04L 5/0094 370/330 |
| 2014/0056279 A1* | 2/2014 | Chen | H04W 52/04 370/330 |
| 2014/0078980 A1* | 3/2014 | Frenne | H04L 5/0007 370/329 |
| 2014/0128085 A1* | 5/2014 | Charbit | H04L 5/00 455/450 |
| 2015/0003349 A1* | 1/2015 | Kim | H04W 72/042 370/329 |
| 2015/0237607 A1* | 8/2015 | Frederiksen | H04L 5/0053 370/329 |
| 2015/0245330 A1* | 8/2015 | Sartori | H04L 5/0053 370/329 |
| 2016/0065333 A1* | 3/2016 | Blankenship | H04W 72/042 370/329 |

OTHER PUBLICATIONS

ZTE, "PCFICH detection error handling", 3GPP TSG-RAN WG1 #61, R1-102889, Montreal, Canada, May 10-14, 2010, (http://www.3gpp.org/ftp/tsg_ran/wg1_rl1/TSGR1_61/Docs/), See p. 1, lines 1-13; p. 2, lines 9-15; and table 1.

* cited by examiner

⊠ PCFICH
▨ PHICH
▨ PDSCH
▨ PDCCH region

METHOD AND APPARATUS FOR MONITORING DOWNLINK CONTROL CHANNEL

CROSS REFERENCE TO RELATED APPLICATIONS

This application is the National Phase of PCT International Application No. PCT/KR2013/004611, filed on May 27, 2013, which claims priority under 35 U.S.C. 119(e) to U.S. Provisional Application No. 61/651,558 filed on May 25, 2012, 61/662,320 filed on Jun. 20, 2012 and 61/679,081 filed on Aug. 3, 2012, all of which are hereby expressly incorporated by reference into the present application.

BACKGROUND OF THE INVENTION

Field of the Invention

The present invention relates to wireless communications, and more particularly, to a method of monitoring a downlink control channel in a wireless communication system, and a wireless device using the method.

Related Art

Long term evolution (LTE) based on 3rd generation partnership project (3GPP) technical specification (TS) release 8 is a promising next-generation mobile communication standard. Recently, LTE-advanced (LTE-A) based on 3GPP TS release 10 supporting multiple carriers is under standardization.

As disclosed in 3GPP TS 36.211 V10.2.0 (2011-06) "Evolved Universal Terrestrial Radio Access (E-UTRA); Physical Channels and Modulation (Release 10)", a physical channel of 3GPP LTE/LTE-A can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

To cope with increasing data traffic, various techniques are introduced to increase transmission capacity of a mobile communication system. For example, a multiple input multiple output (MIMO) technique using multiple antennas, a carrier aggregation technique supporting multiple cells, etc., are introduced.

The PDCCH designed in 3GPP LTE/LTE-A carries a variety of control information. The introduction of a new technology requires to increase capacity of the control channel and to improve scheduling flexibility.

SUMMARY OF THE INVENTION

The present invention provides a method of monitoring a downlink control channel, and a wireless device using the method.

In an aspect, a method for monitoring a control channel in a wireless communication system is provided. The method includes receiving, by a wireless device, indication information for indicating a search space for a downlink control channel on an indication channel, and monitoring, by the wireless device, the downlink control channel in the search space. The search space is defined by one or more physical resource block (PRB) pairs.

A resource region in which the indication channel is received and the search space may be located in the same subframe.

The one or more PRB pairs may contain N enhanced control channel elements (ECCEs), where $N \geq 1$.

The resource region in which the indication channel is received partially or entirely overlaps with the search space.

In another aspect, a wireless device for monitoring a control channel in a wireless communication system is provided. The wireless device includes a radio frequency (RF) unit configured to transmit and receive a radio signal, and a processor operatively coupled to the RF unit and configured to receive indication information for indicating a search space for a downlink control channel on an indication channel, and monitor the downlink control channel in the search space. The search space is defined by one or more physical resource block (PRB) pairs.

A base station can flexibly schedule a downlink control channel. A wireless device can monitor a plurality of downlink control channels in one subframe.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS) release 8 or 3GPP LTE-advanced (LTE-A) based on 3GPP TS release 10. However, this is for exemplary purposes only, and thus the present invention is also applicable to various wireless communication networks. In the following description, LTE and/or LTE-A are collectively referred to as LTE.

The wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as the CI of the primary cell. It is assumed hereinafter that the CI of the primary cell is 0 and a CI of the secondary cell is allocated sequentially starting from 1.

Figure 1:
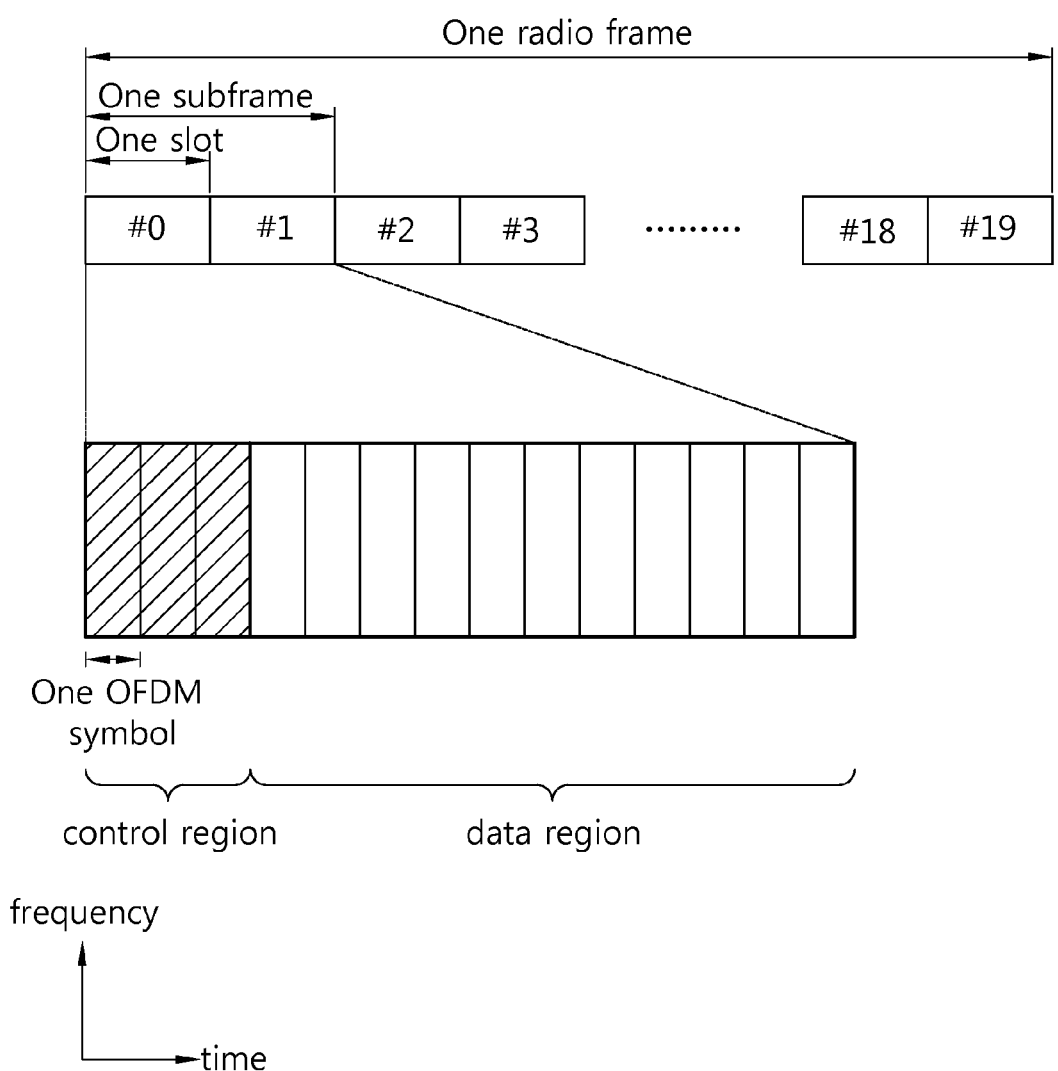
FIG. 1 shows a structure of a downlink (DL) radio frame in $3^{rd}$ generation partnership project (3GPP) long term evolution-advanced (LTE-A).

FIG. 1 shows a structure of a DL radio frame in 3GPP LTE-A. The section 6 of 3GPP TS 36.211 V10.2.0 (2011-06) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in multiple access schemes or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V10.2.0, examples of a physical control channel in 3GPP LTE/LTE-A include a physical downlink control channel (PDCCH), a physical control format indicator channel (PCFICH), and a physical hybrid-ARQ indicator channel (PHICH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (MACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE/LTE-A, transmission of a DL transport block is performed in a pair of the PDCCH and the PDSCH. Transmission of a UL transport block is performed in a pair of the PDCCH and the PUSCH. For example, the wireless device receives the DL transport block on a PDSCH indicated by the PDCCH. The wireless device receives a DL resource assignment on the PDCCH by monitoring the PDCCH in a DL subframe. The wireless device receives the DL transport block on a PDSCH indicated by the DL resource assignment.

Figure 2:
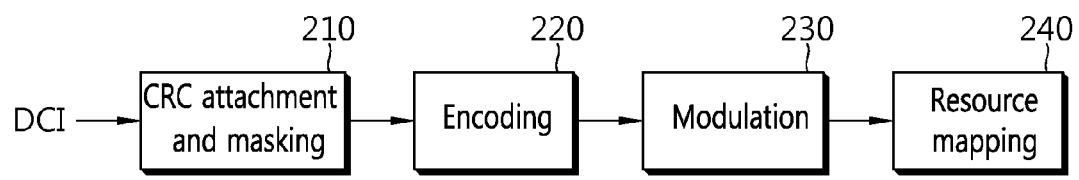
FIG. 2 is a block diagram showing a structure of a physical downlink control channel (PDCCH).

FIG. 2 is a block diagram showing a structure of a PDCCH.

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

A BS determines a PDCCH format according to DCI to be transmitted to a wireless device, attaches a CRC to control information, and masks a unique identifier (referred to as a radio network temporary identifier (RNTI)) to the CRC according to an owner or usage of the PDCCH (block 210).

If the PDCCH is for a specific wireless device, a unique identifier (e.g., cell-RNTI (C-RNTI)) of the wireless device may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the wireless device, a random access-RNTI (RA-RNTI) may be masked to the CRC. To indicate a transmit power control (TPC) command for a plurality of wireless devices, a TPC-RNTI may be masked to the CRC.

When the C-RNTI is used, the PDCCH carries control information for a specific wireless device (such information is called UE-specific control information), and when other RNTIs are used, the PDCCH carries common control information received by all or a plurality of wireless devices in a cell.

The CRC-attached DCI is encoded to generate coded data (block 220). Encoding includes channel encoding and rate matching.

The coded data is modulated to generate modulation symbols (block 230).

The modulation symbols are mapped to physical resource elements (REs) (block 240). The modulation symbols are respectively mapped to the REs.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of REs. According to an association relation of the number of CCEs and the coding rate provided by the CCEs, a PDCCH format and a possible number of bits of the PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Figure 3:
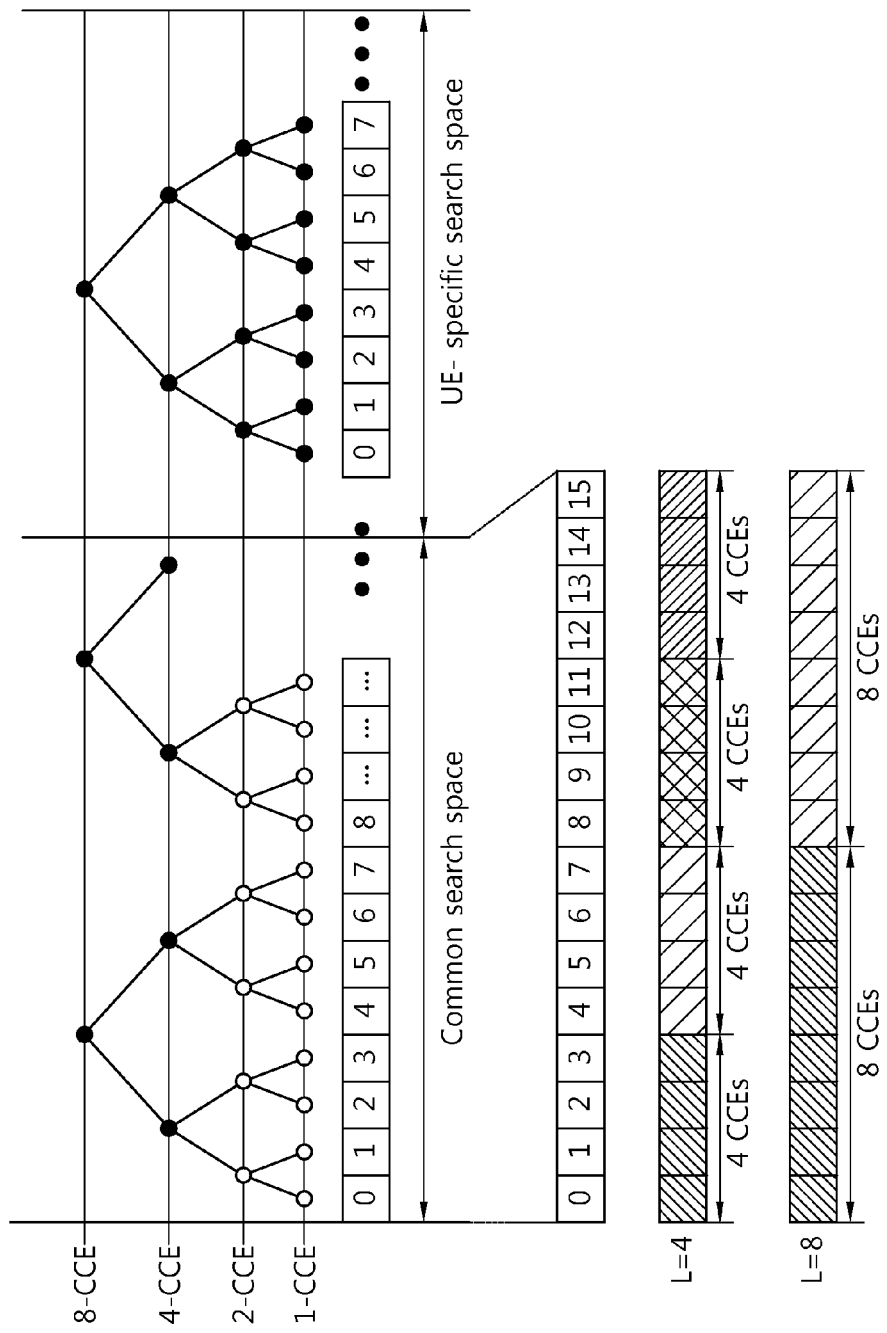
FIG. 3 shows an example of monitoring a PDCCH.

FIG. 3 shows an example of monitoring a PDCCH. The section 9 of 3GPP TS 36.213 V10.2.0 (2011-06) can be incorporated herein by reference.

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. A wireless device cannot know about a specific position in a control region in which its PDCCH is transmitted and about a specific CCE aggregation or DCI format used for PDCCH transmission.

A plurality of PDCCHs can be transmitted in one subframe. The wireless device monitors the plurality of PDCCHs in every subframe. Monitoring is an operation of attempting PDCCH decoding by the wireless device according to a format of the monitored PDCCH.

The 3GPP LTE uses a search space to reduce a load of blind decoding. The search space can also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, IA) for carrying UE-specific information can also be transmitted in the common search space. The UE-specific search space supports a PDCCH having a CCE aggregation level of {1, 2, 4, 8}.

Table 1 shows the number of PDCCH candidates monitored by the wireless device.

TABLE 1

| Search Space Type | Aggregation level L | Size [In CCEs] | Number of PDCCH candidates | DCI formats |
|---|---|---|---|---|
| UE-specific | 1 | 6 | 6 | 0, 1, 1A, 1B, 1D, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

A size of the search space is determined by Table 1 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level L∈{1,2,3,4}, a search space $S^{(L)}_k$ is defined as a set of PDCCH candidates. A CCE corresponding to a PDCCH candidate m of the search space $S^{(L)}_k$ is given by Equation 1 below.

$$L \cdot \{(Y_k - m') \bmod \lfloor N_{CCE,k}/L \rfloor\} + i \qquad \text{[Equation 1]}$$

Herein, i=0, 1, ..., L−1, m=0, ..., $M^{(L)}$−1, and $N_{CCE,k}$ denotes the total number of CCEs that can be used for PDCCH transmission in a control region of a subframe k. The control region includes a set of CCEs numbered from 0 to $N_{CCE,k}-1$. $M^{(L)}$ denotes the number of PDCCH candidates in a CCE aggregation level L of a given search, space.

If a carrier indicator field (CIF) is set to the wireless device, $m'=m+M^{(L)}n_{CIF}$. Herein, $n_{CIF}$ is a value of the CIF. If the CIF is not set to the wireless device, $m'=m$.

In a common search space, $Y_k$ is set to 0 with respect to two aggregation levels L=4 and L=8.

In a UE-specific search space of the aggregation level L, a variable $Y_k$ is defined by Equation 2 below.

$$Y_k = (A \cdot Y_{k-1}) \mod D \qquad \text{[Equation 2]}$$

Herein, $Y_{-1} = n_{RNTI} \neq 0$, A=39827, D=65537, k=floor($n_s/2$), and $n_s$ denotes a slot number in a radio frame.

When the wireless device monitors the PDCCH by using the C-RNTI, a search space and a DCI format used in monitoring are determined according to a transmission mode of the PDSCH.

Figure 4:
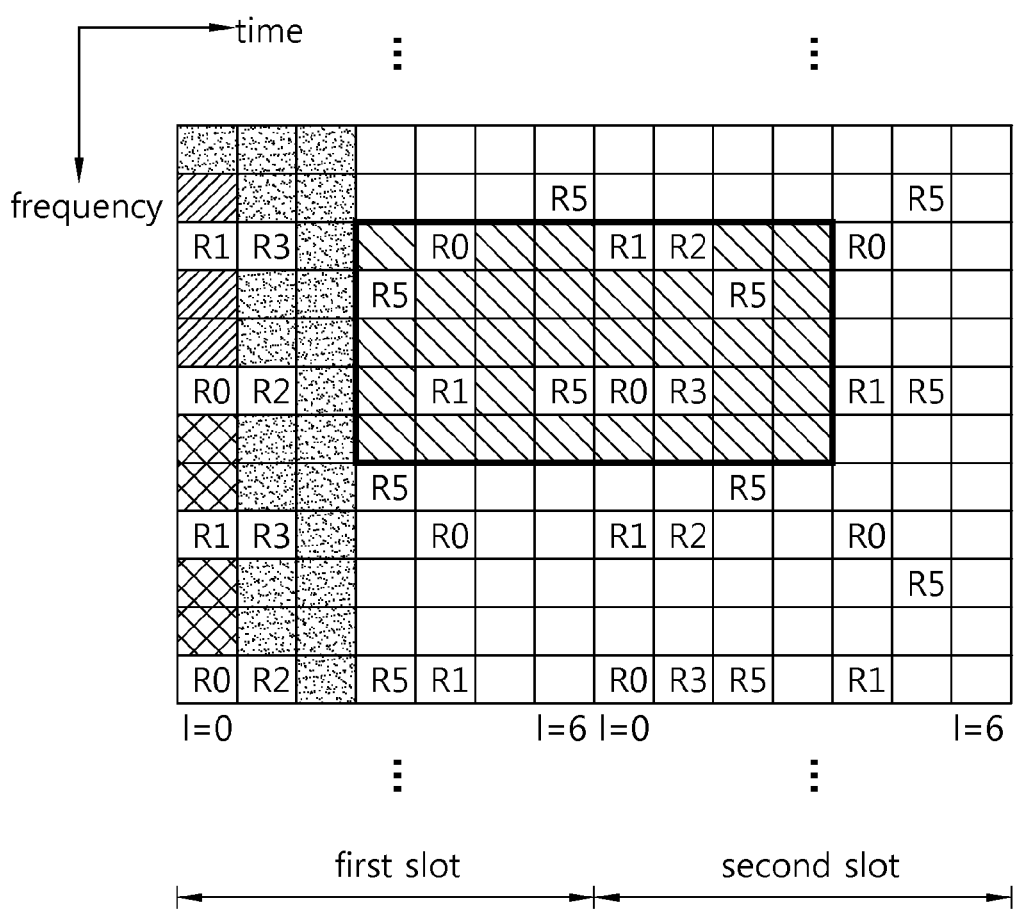
FIG. 4 shows an example of arranging a reference signal and a control channel in a DL subframe of 3GPP LTE.

FIG. 4 shows an example of arranging a reference signal and a control channel in a DL subframe of 3GPP LTE.

A control region (or a PDCCH region) includes first three OFDM symbols, and a data region in which a PDSCH is transmitted includes the remaining OFDM symbols.

A PCFICH, a PHICH, and/or a PDCCH are transmitted in the control region. A control format indictor (CFI) of the PCFICH indicates three OFDM symbols. A region excluding a resource in which the PCFICH and/or the PHICH are transmitted in the control region is a PDCCH region which monitors the PDCCH.

Various reference signals are transmitted in the subframe.

A cell-specific reference signal (CRS) may be received by all wireless devices in a cell, and is transmitted across a full downlink frequency band. In FIG. 4, 'R0' indicates a resource element (RE) used to transmit a CRS for a first antenna port, 'R1' indicates an RE used to transmit a CRS for a second antenna port, 'R2' indicates an RE used to transmit a CRS for a third antenna port, and 'R3' indicates an RE used to transmit a CRS for a fourth antenna port.

An RS sequence $r_{1,ns}(m)$ for a CRS is defined as follows.

$$r_{l,ns}(m) = \frac{1}{\sqrt{2}}(1 - 2 \cdot c(2m)) + j\frac{1}{\sqrt{2}}(1 - 2 \cdot c(2m+1)) \qquad \text{[Equation 3]}$$

Herein, m=0, 1, . . . , $2N_{maxRB}-1$. $N_{maxRB}$ is the maximum number of RBs. ns is a slot number in a radio frame. l is an OFDM symbol index in a slot.

A pseudo-random sequence c(i) is defined by a length-31 gold sequence as follows.

$c(n) = (x_1(n+Nc) + x_2(n+Nc)) \mod 2$ $x_1(n+31) = (x_1(n+3) + x_1(n)) \mod 2$ $x_2(n+31) = (x_2(n+3) + x_2(n+2) + x_2(n+1) + x_2(n)) \mod 2$ [Equation 4]

Herein, Nc=1600, and a first m-sequence is initialized as $x_1(0)=1$, $x_1(n)=0$, m=1, 2, . . . , 30.

A second m-sequence is initialized as $c_{init} = 2^{10}(7(ns+1)+1+1)(2N^{cell}_{ID}+1)+2N^{cell}_{ID}+N_{CP}$ at a start of each OFDM symbol. $N^{cell}_{ID}$ is a physical cell identifier (PCI). $N_{CP}=1$ in a normal CP case, and $N_{CP}=0$ in an extended CP case.

A UE-specific reference signal (URS) is transmitted in the subframe. Whereas the CRS is transmitted in the entire region of the subframe, the URS is transmitted in a data region of the subframe and is used to demodulate the PDSCH. In FIG. 4, 'R5' indicates an RE used to transmit the URS. The URS is also called a dedicated reference signal (DRS) or a demodulation reference signal (DM-RS).

The URS is transmitted only in an RB to which a corresponding PDSCH is mapped. Although R5 is indicated in FIG. 4 in addition to a region in which the PDSCH is transmitted, this is for indicating a location of an RE to which the URS is mapped.

The URS is used only by a wireless device which receives a corresponding PDSCH. A reference signal (RS) sequence $r_{ns}(m)$ for the URS is equivalent to Equation 3. In this case, m0, 1, . . . , $12N_{PDSCH,RB}-1$, and $N_{PDSCH,RB}$ is the number of RBs used for transmission of a corresponding PDSCH. A pseudo-random sequence generator is initialized as $C_{init}=$ (floor(ns/2)+1)(2 $N^{cell}_{ID}+1)2^{16}+n_{RNTI}$ at a start of each subframe. $n_{RNTI}$ is an identifier of the wireless device.

The aforementioned initialization method is for a case where the URS is transmitted through the single antenna, and when the URS is transmitted through multiple antennas, the pseudo-random sequence generator is initialized as $c_{init}=$ (floor(ns/2)+1)2 $N^{cell}_{ID}+1)2^{16}+n_{SCID}$ at a start of each subframe. $n_{SCID}$ is a parameter acquired from a DL grant (e.g., a DCI format 2B or 2C) related to PDSCH transmission.

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 5:
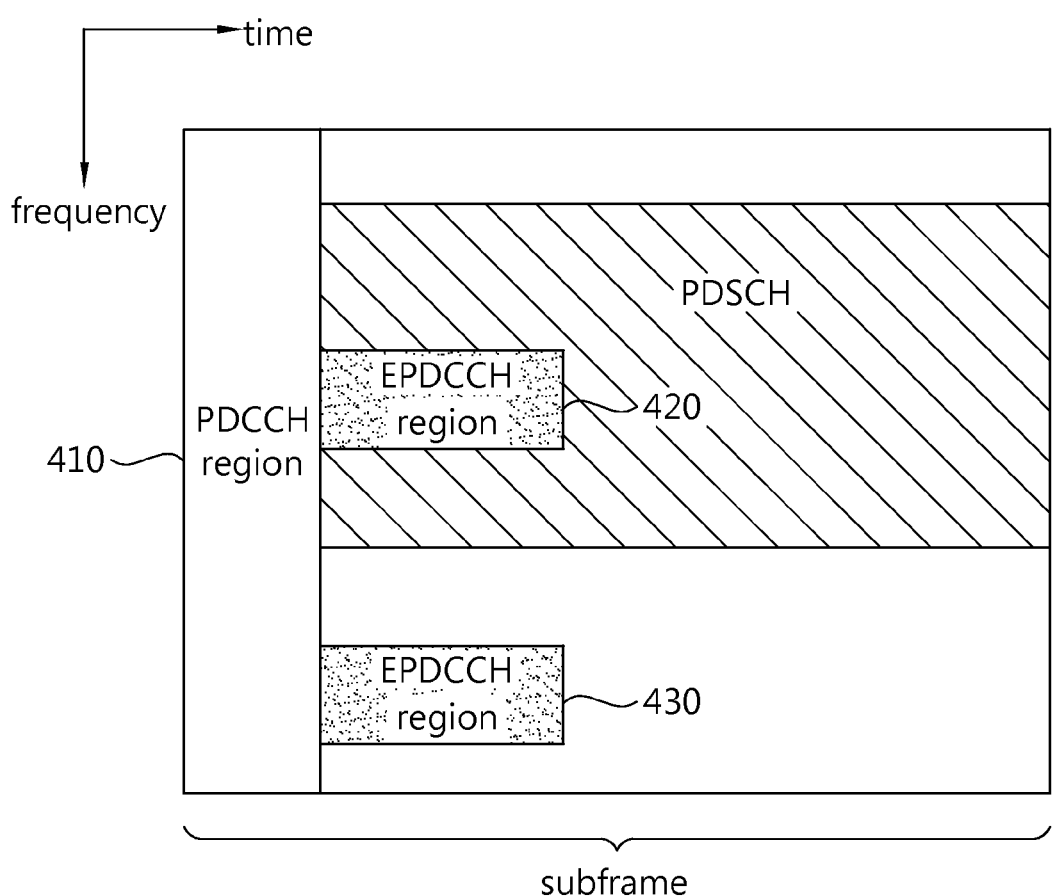
FIG. 5 is an example of a subframe having an enhanced PDCCH (EPDCCH).

FIG. 5 is an example of a subframe having an EPDCCH.

A subframe may include zero or one PDCCH region 410 and zero or more EPDCCH regions 420 and 430.

The EPDCCH regions 420 and 430 are regions in which a wireless device monitors the EPDCCH. The PDCCH region 410 is located in up to first four OFDM symbols of the subframe, whereas the EPDCCH regions 420 and 430 may be flexibly scheduled in an OFDM symbol located after the PDCCH region 410.

One or more EPDCCH regions 420 and 430 may be assigned to the wireless device. The wireless device may monitor EPDDCH data in the assigned EPDCCH regions 420 and 430.

The number/location/size of the EPDCCH regions 420 and 430 and/or information regarding a subframe for monitoring the EPDCCH may be reported by a BS to the wireless device by using a radio resource control (RRC) message or the like.

In the PDCCH region 410, a PDCCH may be demodulated on the basis of a CRS. In the EPDCCH regions 420 and 430, instead of the CRS, a DM-RS may be defined for demodulation of the EPDCCH. An associated DM-RS may be transmitted in the EPDCCH regions 420 and 430.

An RS sequence for the associated DM-RS is equivalent to Equation 3. In this case, m=0, 1, . . . , 12NRB-1, and NRB is a maximum number of RBs. A pseudo-random sequence generator may be initialized as cinit=(floor(ns/2)+1)(2 NEPDCCH,ID+1)216+nEPDCCH,SCID at a start of each subframe. ns is a slot number of a radio frame. NEPDCCH,ID is a cell index related to a corresponding EPDCCH region. nEPDCCH,SCID is a parameter given from higher layer signaling.

Each of the EPDCCH regions 420 and 430 may be used to schedule a different cell. For example, an EPDCCH in the EPDCCH region 420 may carry scheduling information for a primary cell, and an EPDCCH in the EPDCCH region 430 may carry scheduling information for a secondary cell.

When the EPDCCH is transmitted through multiple antennas in the EPDCCH regions 420 and 430, the same precoding as that used in the EPDCCH may be applied to a DM-RS in the EPDCCH regions 420 and 430.

Comparing with a case where the PDCCH uses a CCE as a transmission resource unit, a transmission resource unit for the EPDCCH is called an enhanced control channel element (ECCE). An aggregation level may be defined as a resource unit for monitoring the EPDCCH. For example, when 1 ECCE is a minimum resource for the EPDCCH, it may be defined as an aggregation level L={1, 2, 4, 8, 16}.

A search space may corresponds to a EPDCCH region. In the search space, one or more EPDCCH candidates can be monitored in one or more aggregation level.

Now, resource allocation for an EPDCCH will be described.

The EPDCCH is transmitted by using one or more ECCEs. The ECCE includes a plurality of enhanced resource element groups (EREGs). According to a CP and a subframe type based on a time division duplex (TDD) DL-UL configuration, the ECCE may include 4 EREGs or 8 EREGs. For example, the ECCE may include 4 EREGs in a normal CP case, and may include 8 EREGs in an extended CP case.

A physical resource block (PRB) pair is 2 PRBs having the same RB number in one subframe. The PRB pair is a 1st PRB of a 1st slot and a 2nd PRB of a 2nd slot in the same frequency domain. In the normal CP case, the PRB pair includes 12 subcarriers and 14 OFDM symbols, and thus includes 168 resource elements (REs).

Figure 6:
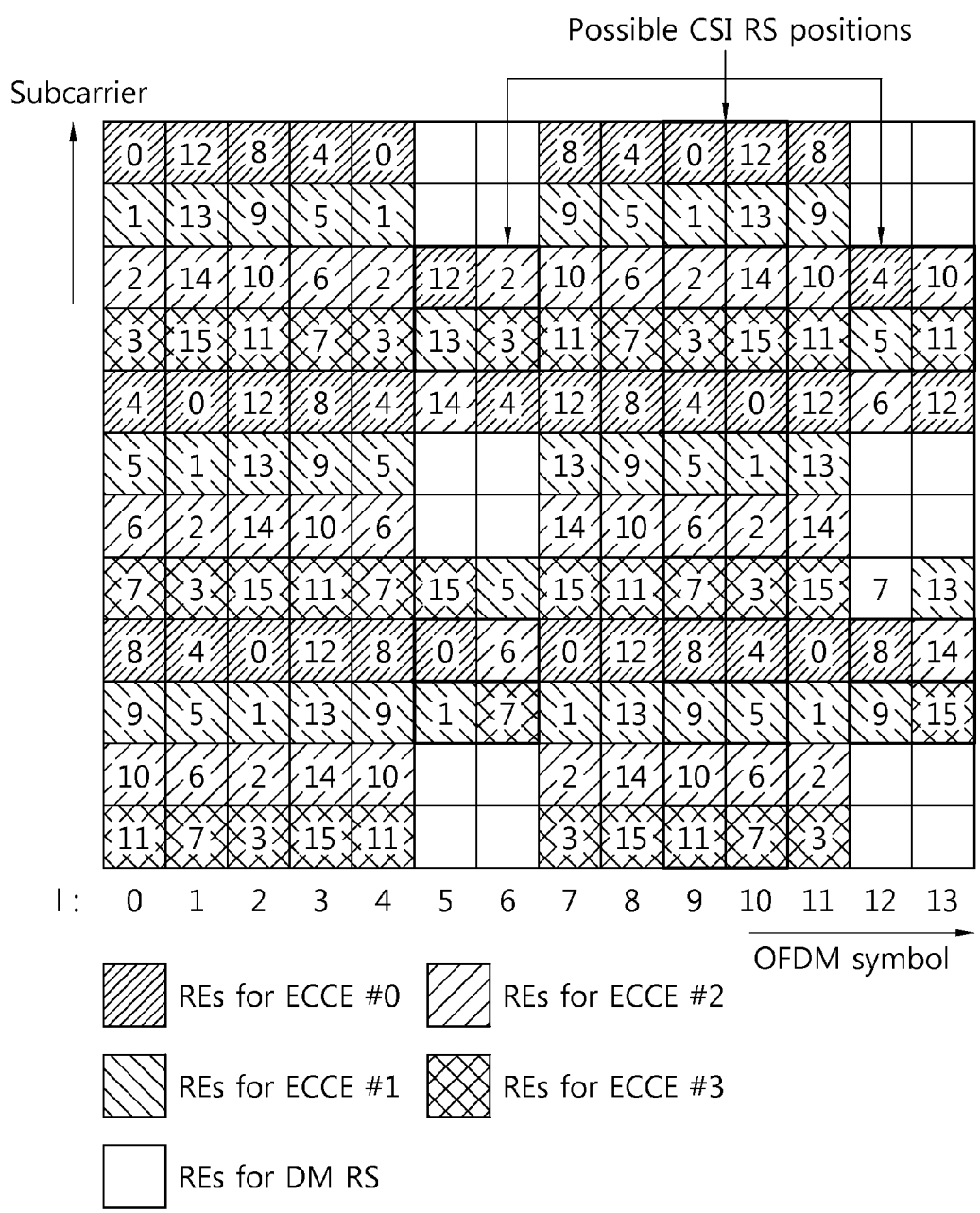
FIG. 6 shows an example of a physical resource block (PRB) pair.

FIG. 6 shows an example of a PRB pair. Although it is assumed hereinafter that a subframe includes 2 slots and a PRB pair in one slot includes 7 OFDM symbols and 12 subcarriers, the number of OFDM symbols and the number of subcarriers are for exemplary purposes only.

In one subframe, the PRB pair includes 168 REs in total. 16 EREGs are configured from 144 REs, except for 24 REs for a DM RS. Therefore, 1 EREG may include 9 REs. However, a CRS-RS or a CRS may be placed to one PRB pair, in addition to the DM RS. In this case, the number of available REs may be decreased, and the number of REs included in 1 EREG may be decreased. The number of REs included in the EREG may be changed, whereas there is no change in the number (i.e., 16) of EREGs included in one PRB pair.

In this case, as shown in FIG. 6, an RE index may be assigned sequentially starting from a first subcarrier of a first OFDM symbol (I=0). Assume that 16 EREGs are indexed from 0 to 15. In this case, 9 REs having an RE index 0 are assigned to an EREG 0. Likewise, 9 REs corresponding to an RE indexk (k=0, . . . , 15) are assigned to an EREG k.

An EREG group is defined by aggregating a plurality of EREGs. For example, if an EREG group having 4 EREGs is defined, it may be defined as an EREG group #0={EREG 0, EREG 4, EREG 8, EREG 12}, an EREG group #1={EREG 1, EREG 5, EREG 9, EREG 3}, an EREG group #2={EREG 2, EREG 6, EREG 10, EREG 14}, and an EREG group #3={EREG 3, EREG 7, EREG 11, EREG 15}. If an EREG group having 8 EREGs is defined, it may be defined as an EREG group #0={EREG 0, EREG 2, EREG 4, EREG 6, EREG 8, EREG 10, EREG 12, EREG 14} and an EREG group #1={EREG 1, EREG 3, EREG 5, EREG 7, EREG 9, EREG 11, EREG 13, EREG 15}.

As described above, the ECCE may include 4 EREGs. In an extended CP case, the ECCE may include 8 EREGs. The ECCE is defined by the EREG group. For example, it is exemplified in FIG. 9 that an ECCE #0 includes an EREG group #0, an ECCE #1 includes an EREG group #1, an ECCE #2 includes an EREG group #2, and an ECCE #3 includes an EREG group #3.

ECCE-to-EREG mapping has two types of transmission, i.e., localized transmission and distributed transmission. In the localized transmission, an EREG group constituting one ECCE is selected from EREGs of one PRB pair. In the distributed transmission, an EREG constituting one ECCE is selected from EREGs of different PRB pairs.

For clarity, units of the search space to monitor a DL control channel may be classified into ECCE, EREG and RE. A ECCE may include 8 EREG or 4 EREG. This is exemplary purpose only. A search space can be referred to as a first search unit (or first allocation unit), a second search unit, a third search unit, etc.

Now, a method of monitoring an EPDCCH is described according to the proposed embodiment.

An EPDCCH region may be located in any PRB pair (or PRB) in a subframe unlike a PDCCH region. In addition, one or more EPDCCH regions may be defined in the subframe.

The EPDCCH may be demodulated by using not only a CRS but also a DM RS as a channel for delivering a variety of control information. In particular, since the EPDCCH region can be dynamically configured in a specific physical resource region in the subframe unlike a fixed PDCCH region, information regarding the EPDCCH region needs to be reported to a corresponding wireless device.

It is proposed to design a control channel for dynamically reporting information on the various EPDCCH regions to the wireless device. Although the control channel is called an enhanced physical control format indicator channel (EPCFICH), this is an exemplary purpose only. The EPCFICH may also be called an indicator channel.

The control information transmitted on the EPCFICH is called an enhanced control format indicator (ECFI) or indicator information. The ECFI may include information regarding one or more EPDCCH regions. The EPDCCH region corresponds to one search space in which the EPDCCH is monitored, and is also called an EPDCCH set. As described above, the EPDCCH re ion may include one or more PRB pairs (PRBs). For example, the ECFI may include at least any one of the following fields.

TABLE 2

| Field | Contents |
|---|---|
| Identifier | Identifier of EPDCCH set (or also referred to as an EPDCCH set index) |
| Transport type | To indicate distributed transmission or local transmission |
| RB allocation | PRB pair for EPDCCH set |
| PUCCH offset | Offset for PUCCH resource |
| RS scramble identity | Scrambling sequence initialization parameter of DM RS for EPDCCH |

The above field name is for exemplary purposes only, and the information may be indicated as one field.

In a subframe, it is required an EPCFICH structure which considers a possibility of being multiplexed with other signals (e.g., a CRS, a DM RS, a CSI-RS, a synchronization signal, a PBCH, etc.) in a specific subframe together with the PDSCH and the EPDCCH.

EPCFICH RE mapping also needs to consider a presence of other signals as if rate-matching, puncturing, etc., is performed by considering the presence of other signals.

Figure 7:
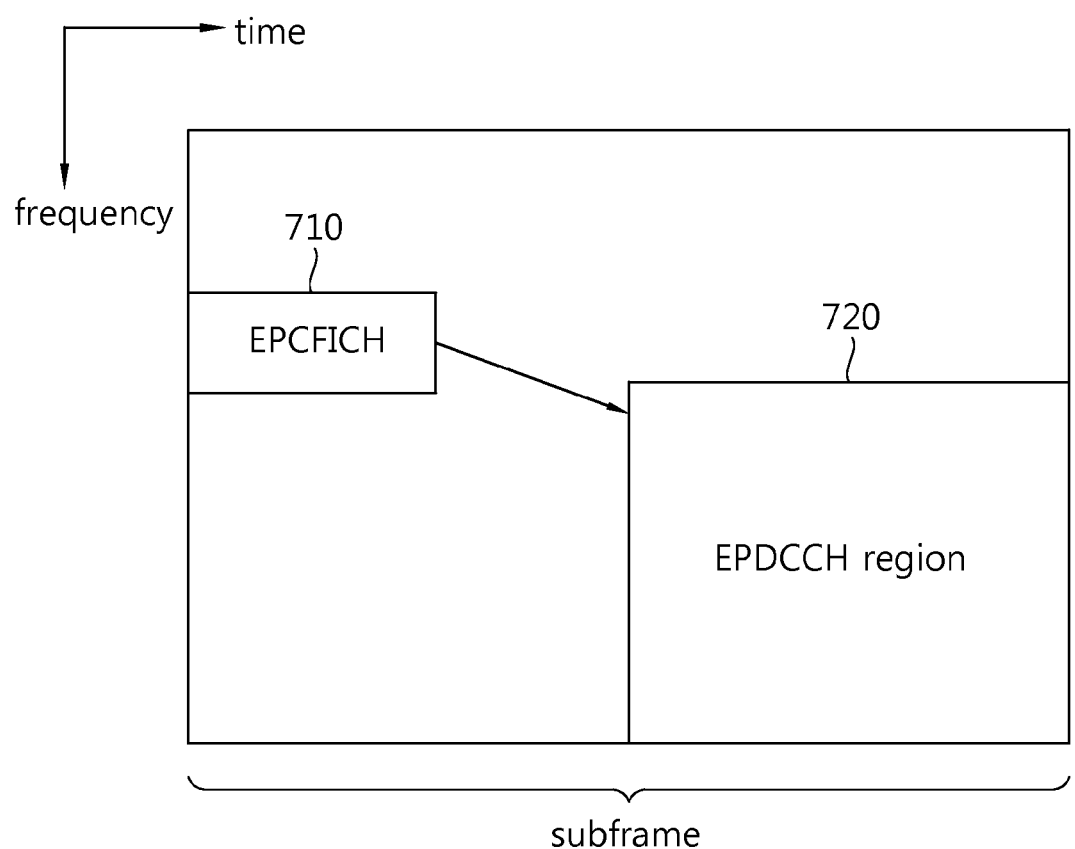
FIG. 7 shows a control channel monitoring method according to an embodiment of the present invention.

FIG. 7 shows a control channel monitoring method according to an embodiment of the present invention.

First, a wireless device receives an ECFI on an EPCFICH 710. Information regarding an EPDCCH region 720 is acquired from the ECFI. The wireless device monitors an EPDCCH in the EPDCCH region 720.

Figure 8:
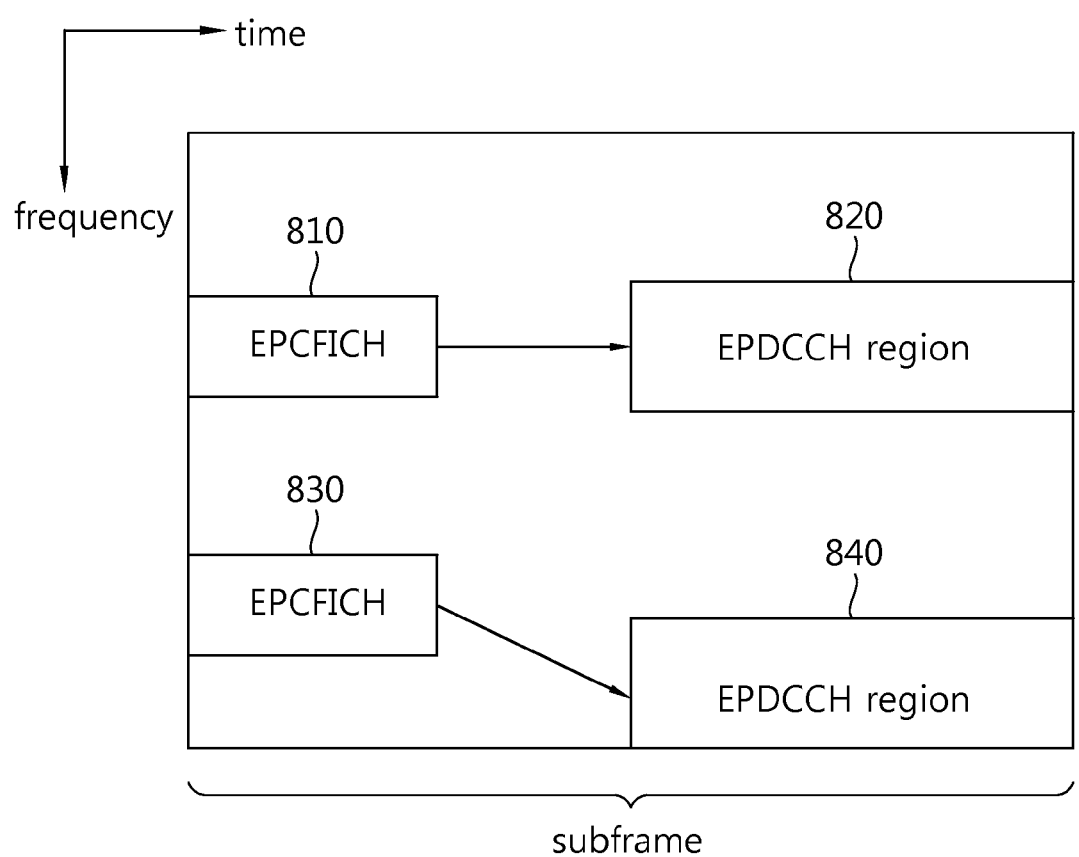
FIG. 8 shows a control channel monitoring method according to another embodiment of the present invention.

FIG. 8 shows a control channel monitoring method according to another embodiment of the present invention.

A first EPDCCH region 820 and a second EPDCCH region 840 are present in a subframe, and are indicated respectively by a first EPCFICH 810 and a second EPCFICH 830.

As described above, the EPDCCH region may be defined by an ECCE consisting of a resource unit called an EREG. Similarly to the legacy PDCCH of which a PDCCH region is defined on the basis of a CCE index, the EPDCCH region may be defined on the basis of an ECCE index or a PRB index or an EREG index. For example, assume that one PRB pair includes 8 EREGs and one ECCE includes 2 EREGs. The EPDCCH region (or also called an EPDCCH set) may be defined by grouping 4 PRB pairs. That is, a search space of a specific wireless device is defined in unit of 4 PRB pairs.

In general, if a small number of wireless devices are scheduled in one subframe, the EPDCCH region may be configured in a minimum basic unit (e.g., 2 PRB pairs). If the number of wireless devices is increased or a size of a DCI set level is increased, a size of the EPDCCH region must also be increased. The size of the EPDCCH region may be increased on a basic unit basis. For example, the size of the EPDCCH region may be extended from 2 PRB pairs which is a basic unit, if necessary, to 4 PRB pairs or 8 PRB pairs. The EPDCCH region of the wireless device may partially or entirely overlap with an EPDCCH region of another wireless device, and thus it cannot be said that one wireless device occupies the PRB pair or 8 PRB pairs. However, according to a presence of other signals, the EPDCCH region of the wireless device is changed, and such a change must be reported by a BS to the wireless device so that normal blind decoding can be performed. Accordingly, reporting of such a change may be one of functions of the EPCFICH.

The EPCFICH may consist of determined bits, and may be mapped to a physical resource region through a coding process such as channel coding, repetition, etc. The number of bits of the ECFI may vary depending on a presence of other signals.

The wireless device may recognize the EPDCCH region after decoding is successful. To receive the EPCFICH, information regarding a resource region in which the EPCFICH is transmitted may be predetermined or may be reported by the BS to the wireless device. The EPCFICH region is called a region to which the EPCFICH is mapped. The EPCFICH region may be fixed to a specific position in a subframe.

A configuration of the EPCFICH region is closely related to RE mapping. If other signals are present, an RE to be mapped to a PCFICH may overlap with an RE of another signal, and thus it is required to design the RE mapping by considering this.

Assume that the RE mapping is performed by the EPCFICH on the basis of an EREG/ECCE. If the EPCFICH is transmitted in one EREG, the number of REs used in an actual EPCFICH may be significantly small due to other signals in the EREG. Accordingly, a coding rate of the EPCFICH may be increased, and a reliability of the EPCFICH may be decreased and an error rate may also be increased. For this, the coding rate of the EPCFICH may be maintained to a specific range, and the number of available REs may be increased.

A plurality of EPDCCH regions may exist in a subframe. One EPDCCH region may include N PRB pairs (N=2,4,6,8). A plurality of EPDCCH regions may have a priority.

According to a presence of other signals, the number of EREGs/ECCEs may also vary in a PRB pair. Although the number of EREGs/ECCEs varies, a relation between a PRB index and an EREG/ECCE index varies, which has an effect on EPDCCH monitoring in the EDPCCH region. The ECFI may include information regarding a configuration of the EPDCCH region. The ECFI may be interpreted in a different meaning according to the relation between the EREG/ECCE indices. If the ECFI includes a 2-bit field, the field may be interpreted to a different meaning according to how to configure the EPDCCH region.

For example, if an overhead of other signals is small, ECFI='00' may indicate a reserved bit, ECFI='01' may indicate a first EPDCCH region (4 PRB pairs), ECFI='10' may indicate a first EPDCCH region (4 PRB pairs) and a second EPDCCH region (4 PRB pairs), and ECFI='11' may indicate a first PDCCH region (4 PRB pairs), a second EPDCCH region (4 PRB pairs), and a third EPDCCH region (4 PRB pairs). If the overhead of other signals is increased, ECFI='01' may indicate a first EPDCCH region (8 PRB pairs), ECFI='10' may indicate a first EPDCCH region (8 PRB pairs) and a second EPDCCH region (8 PRB pairs), and ECFI='11' may indicate a first EPDCCH region (8 PRB pairs), a second EPDCCH region (8 PRB pairs), and a third EPDCCH region (8 PRB pairs).

The meaning of the ECFI may be determined differently according to the number of other signals and a type thereof.

Figure 9:
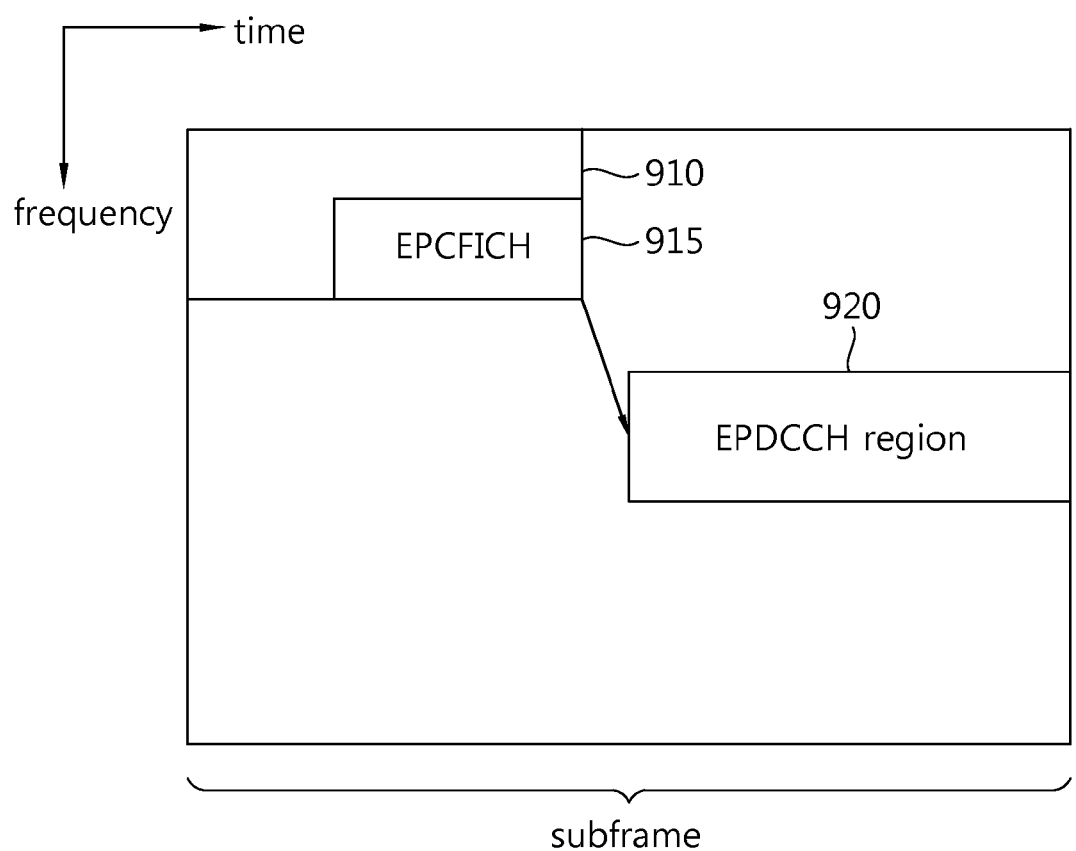
FIG. 9 shows a control channel monitoring method according to another embodiment of the present invention.

FIG. 9 shows a control channel monitoring method according to another embodiment of the present invention.

An EPCFICH 915 is monitored in an EPCFICH region 910. The EPCFICH 915 indicates an EPDCCH region 920 in which an EPDCCH is monitored.

The EPCFICH region may be a search space for monitoring the EPCFICH, and may be defined in one or more PRB pairs in the same manner as the EPDCCH, and may be mapped in an ECCE unit. The EPCFICH region may be defined in a predetermined PRB pair, and an aggregation level and/or the number of EPCFICH candidates may also be predetermined. Alternatively, a BS may report information regarding the EPCFICH region to a wireless device.

An identifier (e.g., I-RNTI) for monitoring the EPCFICH may be defined in the EPCFICH region. The I-RNTI may be cell-specific or device-specific.

The ECFI may include information regarding one or a plurality of EPDCCH regions. Alternatively, the ECFI may include information regarding one EPDCCH region, and a plurality of EPCFICHs may be monitored.

Figure 10:
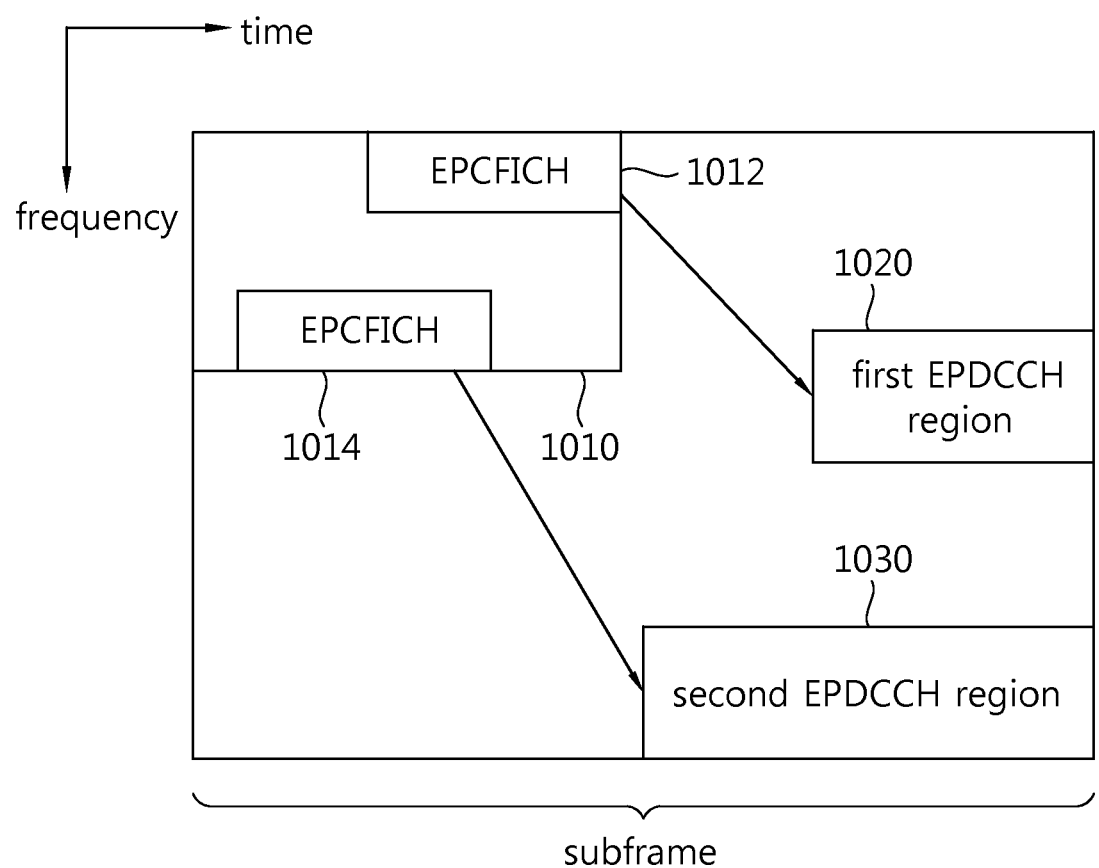
FIG. 10 shows a control channel monitoring method according to another embodiment of the present invention.

FIG. 10 shows a control channel monitoring method according to another embodiment of the present invention.

Two EPCFICHs 1012 and 1014 are monitored in an EPCFICH region 1010. The two EPCFICHs 1012 and 1014 respectively indicate a first EPDCCH 1020 and a second EPDCCH region 1030.

Alternatively, one EPCFICH is monitored in each EPCFICH, and a plurality of EPCFICH regions may be configured to indicate a plurality of EPDCCH regions.

A priority may be determined for the plurality of EPCFICH regions. The wireless device first monitors an EPCFICH region having a top priority. Upon detection of the EPCFICH, an EPCFICH region having a next priority may be monitored.

A monitoring order may be determined as to the plurality of EPCFICH regions. The wireless device may monitor the EPCFICH region in sequence according to the monitoring order.

Embodiments of FIG. 9 and FIG. 10 are examples in which the EPCFICH region and the EPDCCH region are distinguished. However, an RE to which the EPCFICH is mapped may overlap in the EPDCCH region. The wireless device may monitor the EPDCCH other than the RE to which the EPCFICH is mapped in the EPDCCH region.

The EPCFICH may not be transmitted in a subframe in which the EPDCCH is not transmitted. If the EPCFICH is not detected, the wireless device may not monitor the EPDCCH in the subframe.

An ECFI may be interpreted differently according to a bandwidth. For example, if the bandwidth is greater than 100 RBs, ECFI='00' may indicate a first EPDCCH region, and ECFI='01' may indicate the first EPDCCH region and a second EPDCCH region. If the bandwidth is less than 100 RBs, ECFI='00' may indicate a first EPDCCH region and a second EPDCCH region, and ECFI='01' may indicate the first EPDCCH region, the second EPDCCH region, and a third EPDCCH region. This is to indicate more EPDCCH regions by using one EPCFICH when the bandwidth is decreased.

To decrease a payload of the EPCFICH, basic information may be reported by a BS to a UE through a basic message, and the ECFI may include minimum information. The basic message may be an RRC message or system information. For example, the BS first reports information regarding a plurality of EPDCCH region candidates to the wireless device. If the number of the plurality of EPDCCH regions is 4, the BS may indicate which EPDCCH region exists in a corresponding subframe by using a 2-bit ECFI. If the ECFI includes a 4-bit bitmap, the BS may indicate up to 4 EPDCCH regions in a corresponding subframe.

The EPCFICH or EPCFICH region may be configured for each wireless device. A unique EPCFICH or a unique EPCFICH region may be configured only in each wireless device. Alternatively, although there is only one EPCFICH region, the EPCFICH may be monitored on the basis of a unique identifier of a wireless device (or a wireless device group). A start point at which each wireless device monitors the EPCFICH in the same EPCFICH region may vary. The EPCFICH may be monitored on the basis of wireless device specific information such as a device identifier, an antenna port, etc.

Now, a resource region to which the EPCFICH or the EPCFICH region is mapped will be described. Although a resource region to which the EPCFICH is mapped will be described hereinafter for clarity, the EPCFICH region may also be mapped.

A loss of the EPCFICH implies a reception impossibility of the EPDCCH. Therefore, transmission reliability of the EPCFICH is very important.

In particular, if EPCFICH mapping is performed on the basis of an ECCE (or EREG), the number of ECCEs or an RE belonging to a corresponding ECCE may vary according to a presence of other signals in every subframe. Thus, a situation where transmission reliability of the EPCFICH deteriorates according to the presence of other signals may occur. Accordingly, when selecting a resource region to which the EPCFICH is mapped, it is effective to select a resource region which is affected to the least extent by a presence/absence of other signals.

If the EPCFICH and the EPDCCH are designed on the basis of the same ECCE, a resource of the EPCFICH may have an effect on the EPDCCH. According to a specific position at which the EPCFICH resource region is located in a subframe, a resource region of the EPDCCH may vary, and thus a definition of a search space of the EPDCCH may vary. That is, monitoring of the EPDCCH is influenced according to a position of the EPCFICH.

An unaffected RE which does not use even a DM RS and a CSI-RS, that is, which is not affected by other signals, is present in an OFDM symbol in which the DM RS exists. Some or all of the REs may be used in transmission of the EPCFICH.

Now, a detailed example of mapping the EPCFICH to a PRB pair in a subframe will be described.

Figure 11:
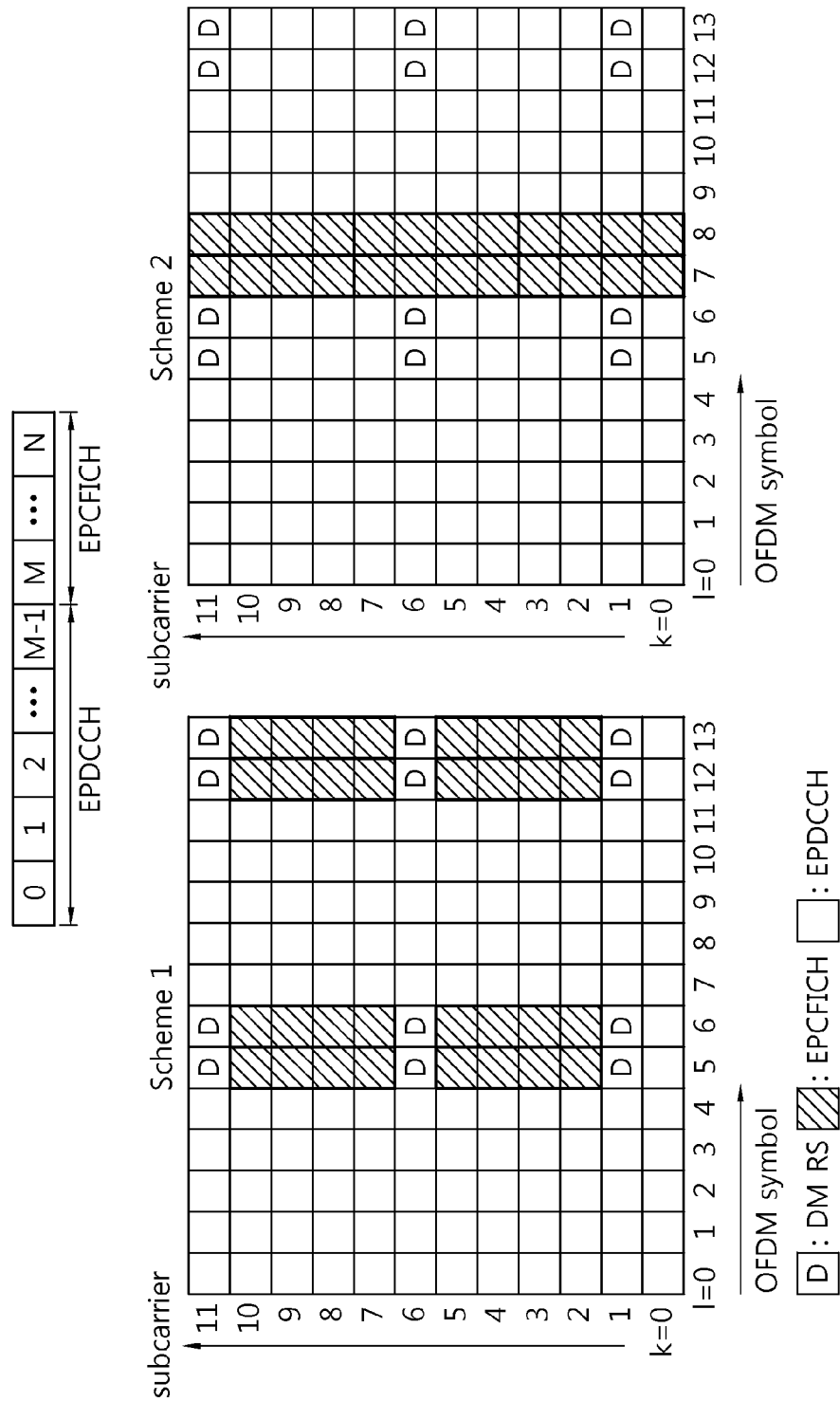
FIG. 11 shows resource mapping according to an embodiment of the present invention.

FIG. 11 shows resource mapping according to an embodiment of the present invention.

If it is assumed that a search space for an EPDCCH or an EPCFICH includes one PRB pair, and N ECCEs are present in one PRB, then M ECCEs are used for EPDCCH monitoring, and N-M ECCEs are used for EPCFICH monitoring. K denotes a subcarrier index, and l denotes an OFDM symbol index.

A position of the EPDCCH and the EPCFICH may vary in the search space, and an offset for the other start point may be defined with respect to a channel which is located first between the two channels.

The N ECCEs in the search space may be divided into two groups, such that a first group is used for EPDCCH monitoring and a second group is used for EPCFICH monitoring. The ECCE may be grouped in sequence in unit of an index, or may be grouped according to a specific pattern.

In addition, grouping may be achieved not in unit of the ECCE but in unit of an EREG or an RE. For example, EREGs in the search space may be divided into two groups, such that a first group is used for EPDCCH monitoring and a second group is used for EPCFICH monitoring.

A subcarrier and/or an OFDM symbol to which the EPCFICH is mapped may be limited in the search space. A 'method 1' shows an example of mapping the EPCFICH to an OFDM symbol in which a DM RS exists, and a 'method 2' shows an example of mapping the EPCFICH to an OFDM symbol in which the DM RS does not exist.

In order to use the method 1 and/or the method 2, an overhead of the DM RS may be fixed in advance to 12 REs. A restriction of the ECCE or the EREG may be minimized due to an existence of an RE to which the DM RS is mapped (this is called a DM RS RE). According to the method 1, a channel estimation performance of the EPCFICH can be improved.

Figure 12:
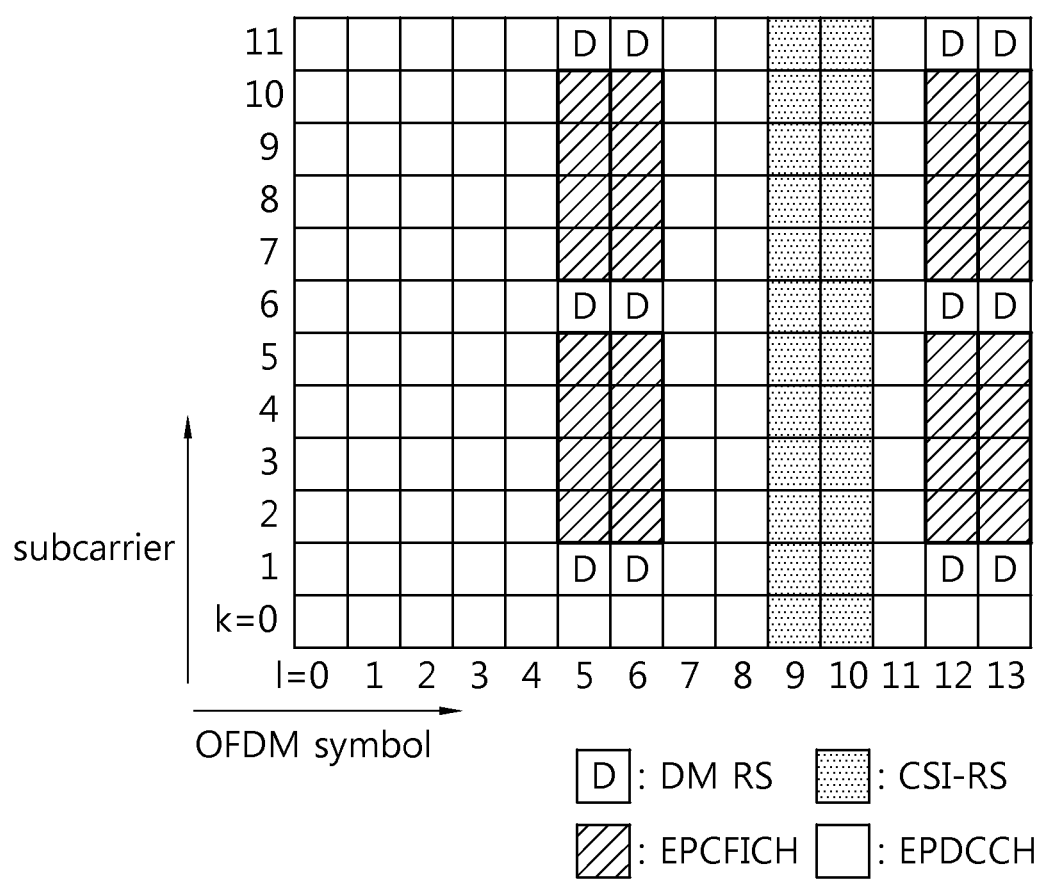
FIG. 12 shows an example in which an enhanced physical control format indicator channel (EPCFICH) is mapped to an orthogonal frequency-division multiplexing (OFDM) symbol having a demodulation reference signal (DM RS).

FIG. 12 shows an example in which an EPCFICH is mapped to an OFDM symbol having a DM RS.

The DM RS supports up to 2 antenna ports, and thus a PRB pair has 12 DM RS REs. The DM RS exists in OFDM symbols l=5, 6, 12, 13, which are called RS OFDM symbols. A position and the number of DM RS REs and a position and the number of RS OFDM symbols are for exemplary purposes only.

If the EPCFICH is mapped to the RS OFDM symbol, the number of DM RS REs may be fixed.

Figure 13:
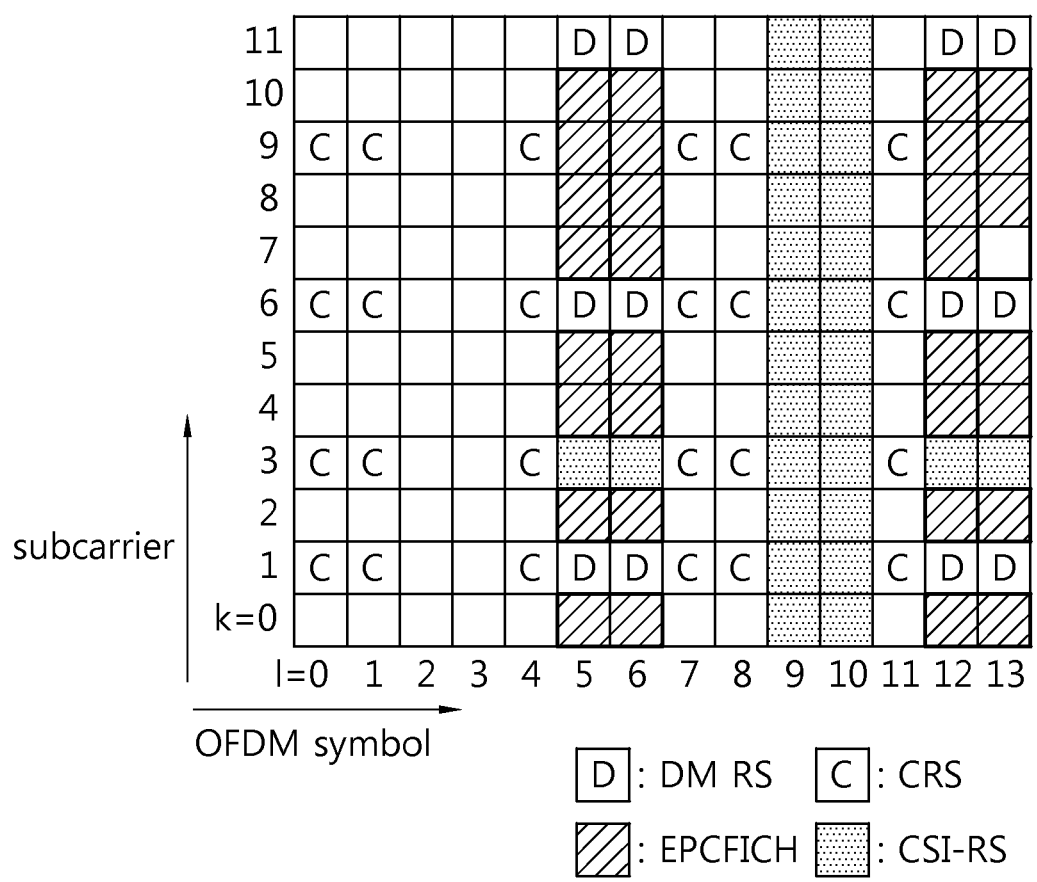
FIG. 13 shows an example in which a cell-specific reference signal (CRS) and a channel state information (CSI)-RS are added in mapping of FIG. 12.

FIG. 13 shows an example in which a CRS and a CSI-RS are added in mapping of FIG. 12.

If an EPCFICH is mapped to OFDM symbols with l=5, 6, 12, 13, it is not affected even if the CRS is present, but there may be an influence caused by the CSI-RS.

When the CSI-RS is located to the OFDM symbols with l=5, 6, 12, 13, it may be restricted such that only two antenna ports are used always. If two or more antenna ports are used for the CSI-RS, transmission of the CSI-RS may not be allowed in the OFDM symbols with l=5, 6, 12, 13. Alternatively, if the three or more antenna ports are used for the CSI-RS, it may be restricted such that the CSI-RS is used only in OFDM symbols with l=9, 10.

Mapping of FIG. 12 may be used in a subframe in which the CSI-RS does not exist, and mapping of FIG. 13 may be used in a subframe in which the CSI-RS exists.

Figure 14:
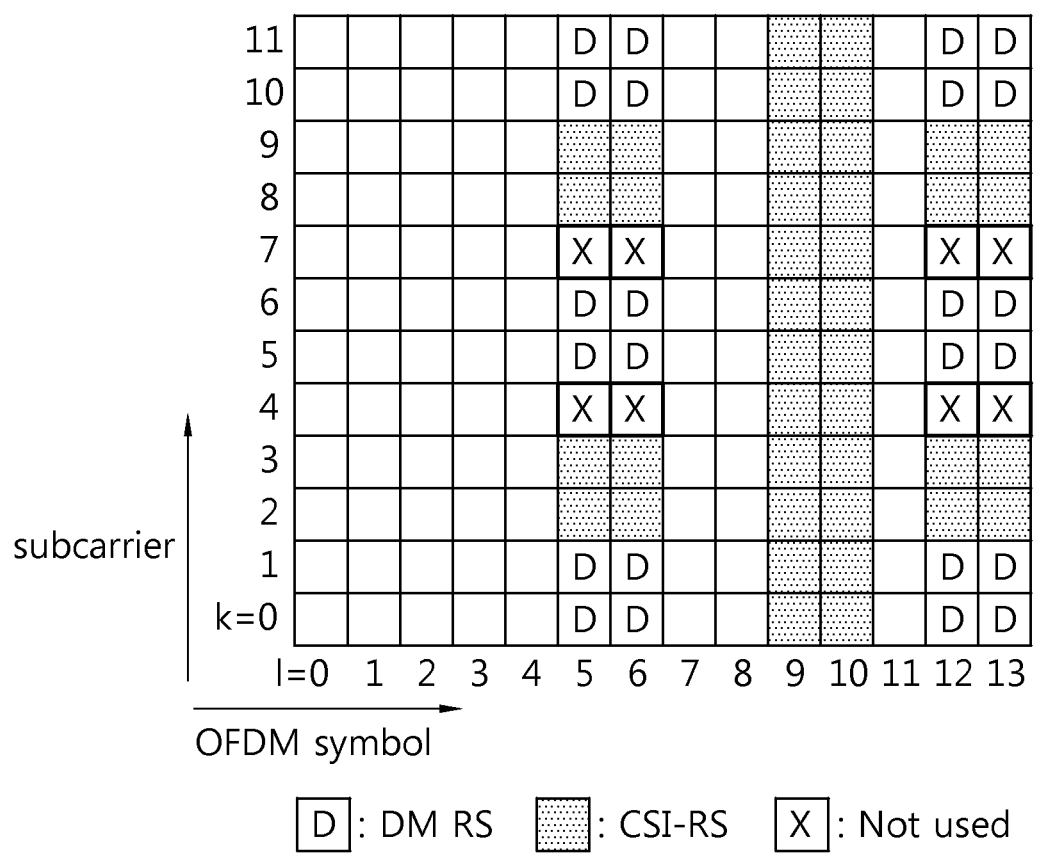
FIG. 14 shows an example in which a DM RS and a CSI-RS are mapped.

FIG. 14 shows an example in which a DM RS and a CSI-RS are mapped.

If 24 DM RS REs are present and four or more antenna ports of the CSI-RS are present in a PRB pair, the number of REs for mapping an EPCFICH to an RS OFDM symbol is insufficient. Therefore, the EPCFICH is not mapped in the RS OFDM symbol.

If a DM RS overhead is greater than or equal to a specific level, a wireless device may not expect that the EPCFICH is transmitted in an RS OFDM symbol and may not monitor the EPCFICH. For example, the wireless device may know that 24 REs are configured to the DM RS, and the CSI-RS is also configured with 8 antenna ports. Thus, the EPCFICH may not be monitored in a corresponding subframe.

Figure 15:
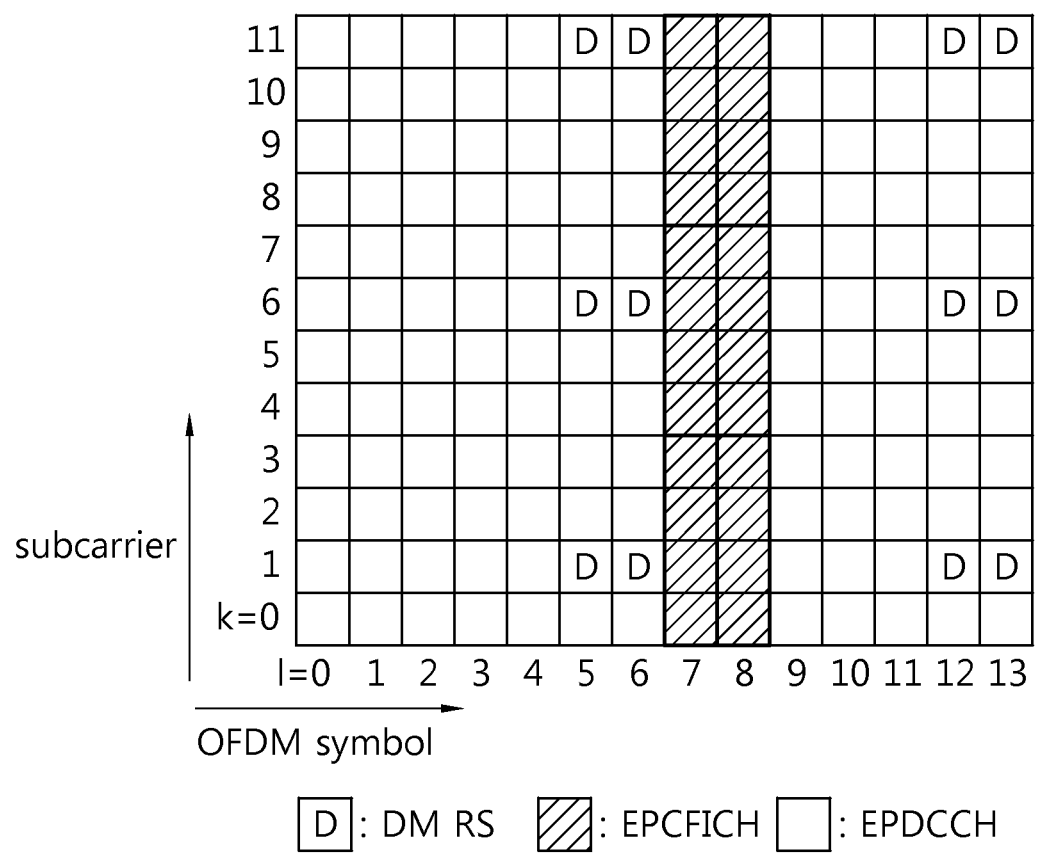
FIG. 15 shows an example in which an EPCFICH is mapped to an OFDM symbol in which a DM RS does not exist.

FIG. 15 shows an example in which an EPCFICH is mapped to an OFDM symbol in which a DM RS does not exist.

A DM RS does not exist in OFMD symbols with l=7, 8. This is called a non-RS OFDM symbol. Each non-RS OFDM symbol has 12 REs, and if an EREG includes 4 REs, 3 EREGs may exist. Repetition is possible three times by using a spreading factor 4, and 16 EPCFICHs in total may be transmitted across 2 OFDM symbols.

According to mapping of FIG. 14, if the EPCFICH cannot be mapped to an RS OFDM symbol, mapping of FIG. 15 may be used.

Figure 16:
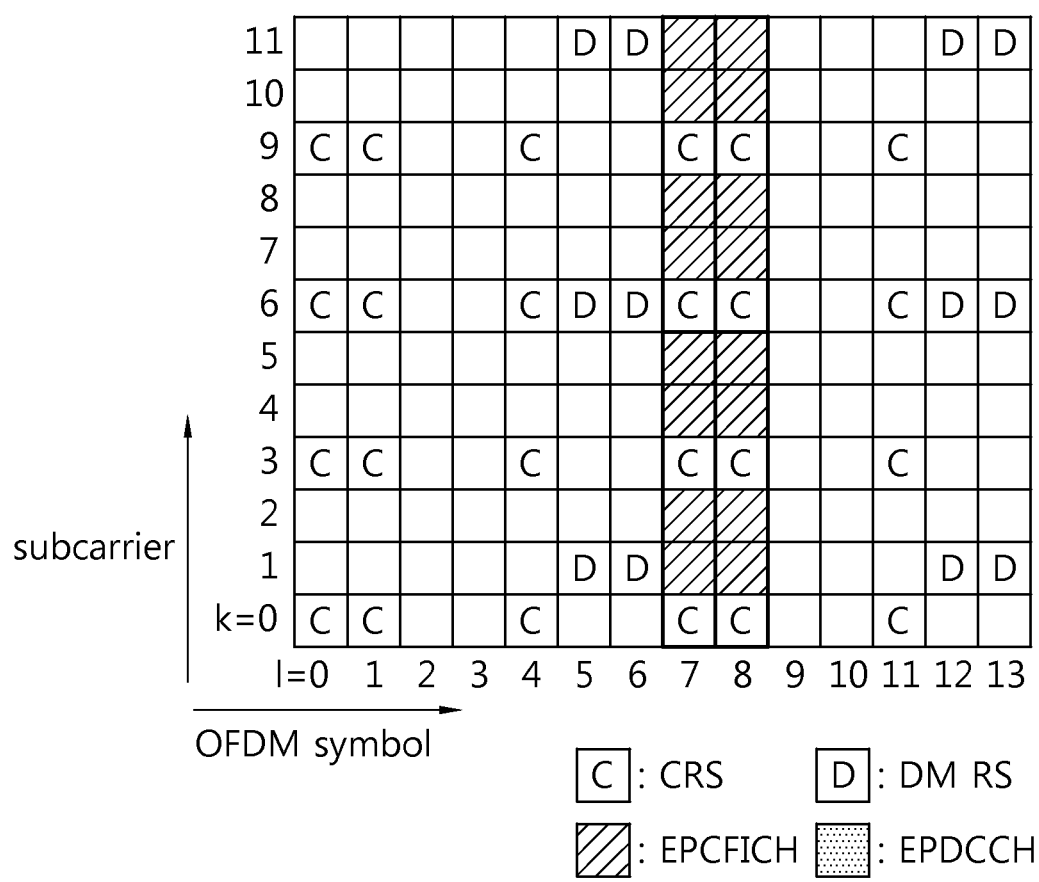
FIG. 16 shows an example in which a CRS is added in mapping of FIG. 15.

FIG. 16 shows an example in which a CRS is added in mapping of FIG. 15.

The CRS exists, and two EREGs may exist in one non-RS OFDM symbol. Repetition is possible two times by using a spreading factor 4, and 8 EPCFICHs in total may be transmitted across 2 OFDM symbols.

Now, it is proposed a method in which a BS multiplexes and transmits a DL control channel (e.g., an EPDCCH and an EPCFICH) in a search space consisting of a PRB pair, and a wireless device monitors the DL control channel.

First, a transmission/monitoring scheme applicable to a control channel can be classified into three cases as follows.

According to a 'localized non-interleaved scheme', search spaces of different wireless devices are not arranged together in a PRB pair, and the PRB pair is not distributed in a frequency domain. Only a DL control channel for one wireless device is monitored in one search space.

Control information for a specific wireless device is not separated to several PRBs. If 4 ECCEs are defined in one PRB pair, they may exist in one PRB pair until an aggregation level 4. However, an aggregation level 8 exists in 2 PRB pairs. In this case, the 2 PRB pairs may be consecutive in a frequency domain, or may not be consecutive.

According to a 'distributed non-interleaved scheme', search spaces of different wireless devices are not arranged together in a PRB pair, and the PRB pair is distributed in a frequency domain. One ECCE includes a plurality of EREGs, and each EREG may be arranged by being distributed to a plurality of PRB pairs. Only a DL control channel for one wireless device is monitored in one search space.

According to a 'distributed interleaved scheme', DL control channels of different wireless devices may be multiplexed in one search space. One ECCE may include a plurality of EREGs, and each EREG may be arranged by being distributed to a plurality of PRB pairs.

A search space for monitoring a DL control channel may consist of k groups, and each group may include N PRB pairs. For example, if K=2 and N=4, two EPCFICH monitoring groups are present, and each monitoring group may include 4 PRB pairs. The values K and N may be configured by a BS, and may be increased along with an increase in the number of serving cells.

The three types of transmission schemes may operate in respective PRB units, but it can also be supported that the 3 types of transmission schemes coexist in a PRB pair.

Figure 17:
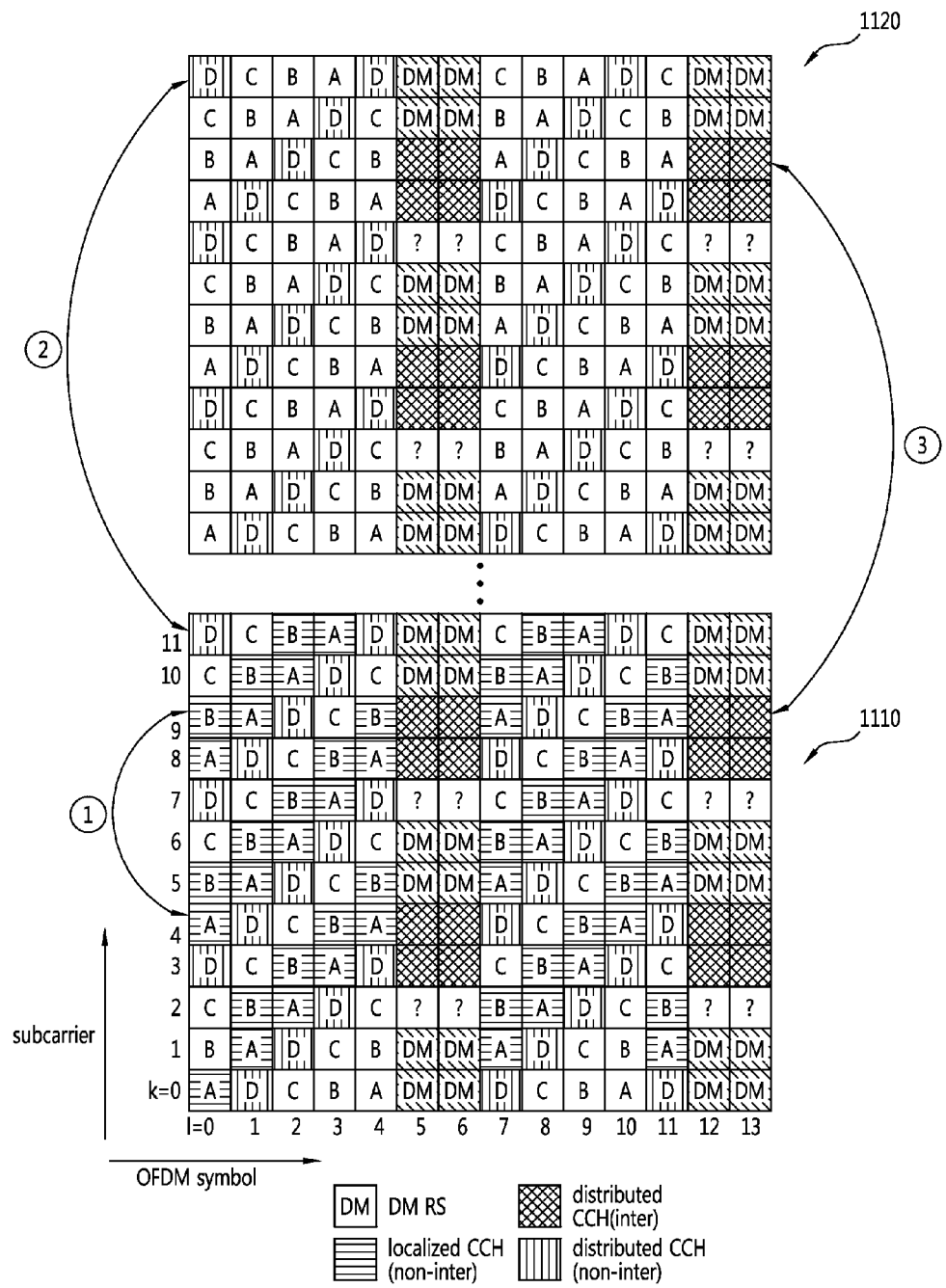
FIG. 17 shows an example in which 3 types of transmission methods coexist.
Figure 18:
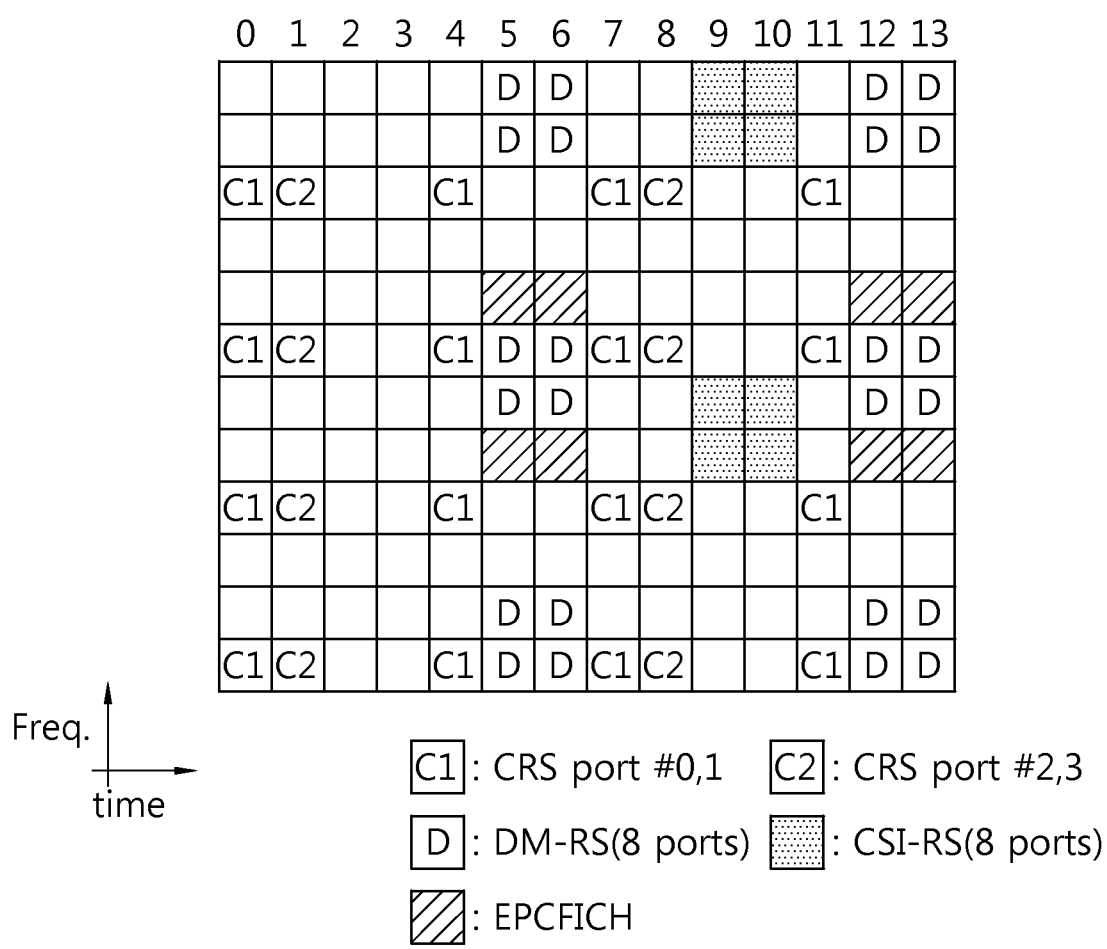
FIG. 18 to FIG. 21 show various examples of EPCFICH mapping.
Figure 19:
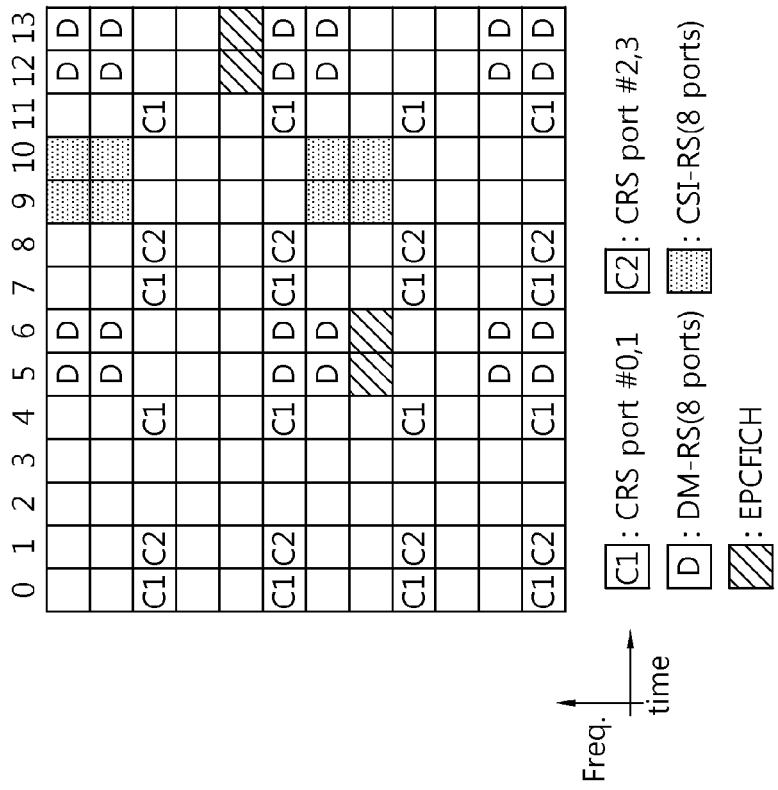
Figure 19:
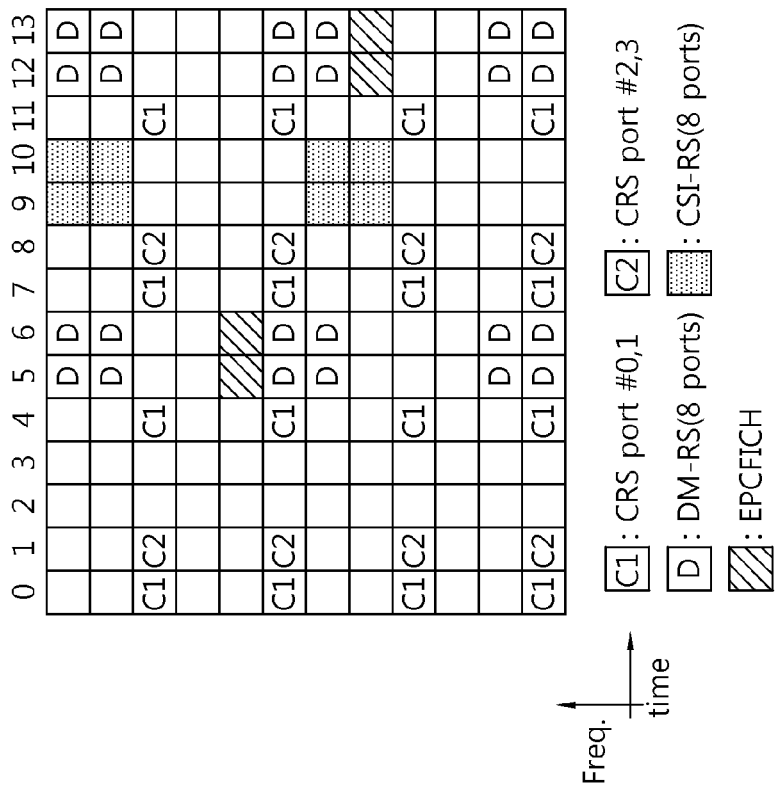
Figure 20:
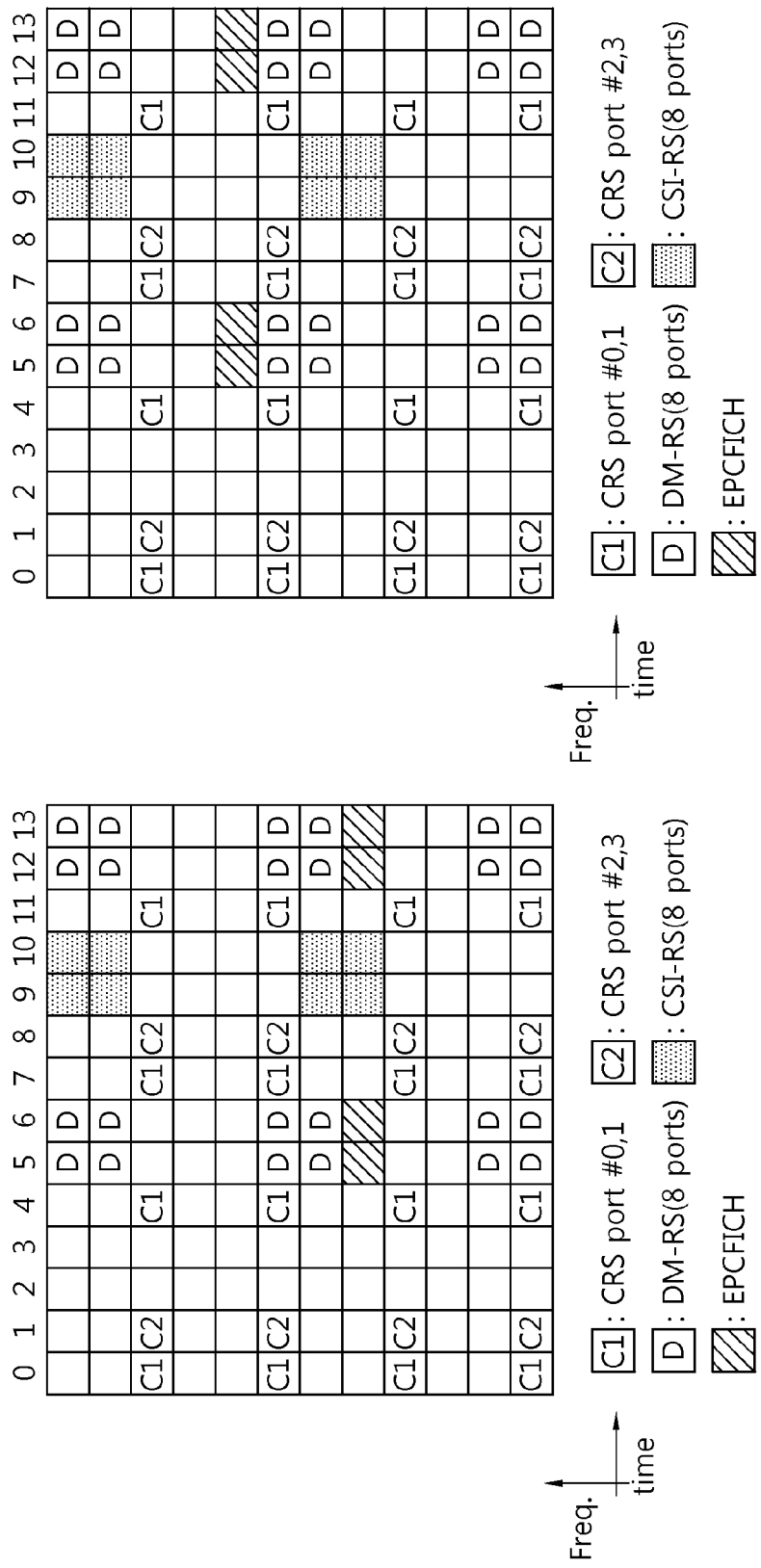
Figure 21:
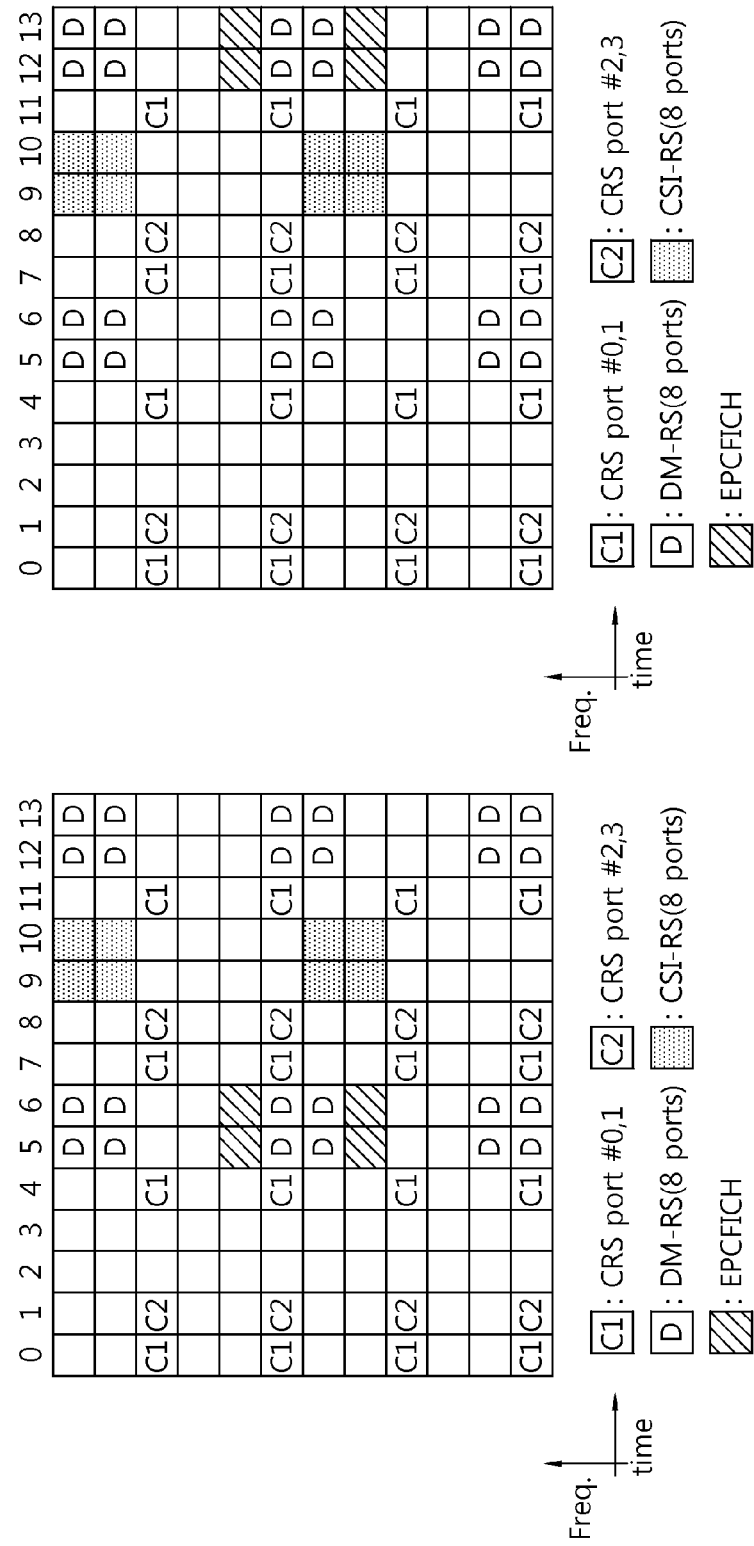

FIG. 17 shows an example in which 3 types of transmission methods coexist.

'1' indicates a local non-interleaving type, '2' indicates a distributed non-interleaving type, and '3' indicates a distributed interleaving type. Although 'A', 'B', 'C', or 'D' indicate an RE for a corresponding control channel, it may be another unit such as an EREG or an ECCE.

According to the local non-interleaving type, a DL control channel is mapped to 'A' and 'B' of a first PRB pair 1110.

According to the non-interleaving type, the DL control channel is mapped to 'D' of the first PRB pair 1110 and 'B' of the second PRB pair 1120.

All of the three transmission methods are used for one PRB pair, and at least two antenna ports are used to use a diversity scheme such as a space frequency block code (SFBC). Therefore, a DM RS overhead of 24 REs may be assumed. If the three transmission methods are not all used in one subframe, a 12-RE overhead may be assumed. Alternatively, if the distributed interleaving type is used, a 24-RE overhead may be assumed, and if the distributed interleaving type is not used, the 12-RE overhead may be assumed. This has an advantage in that additional signaling for the DM RS overhead is not necessary.

Alternatively, the 24-RE overhead may be assumed in a search space in which the distributed interleaving type is used, or the 12-RE overhead or the 24-RE overhead may be assumed in a search space in which the distributed interleaving type is not used.

FIG. 18 to FIG. 21 show various examples of EPCFICH mapping.

Now, a method for supporting high order modulation (HOM) for a DL control channel will be described. A modulation scheme having a modulation order greater than or equal to 4 (16-QAM, 64-QAM, etc.) is applied in the HOM.

If a control channel and a DM RS are deployed in one OFDM symbol, power of the control channel is decreased, and thus it may be difficult to support the HOM.

Figure 22:
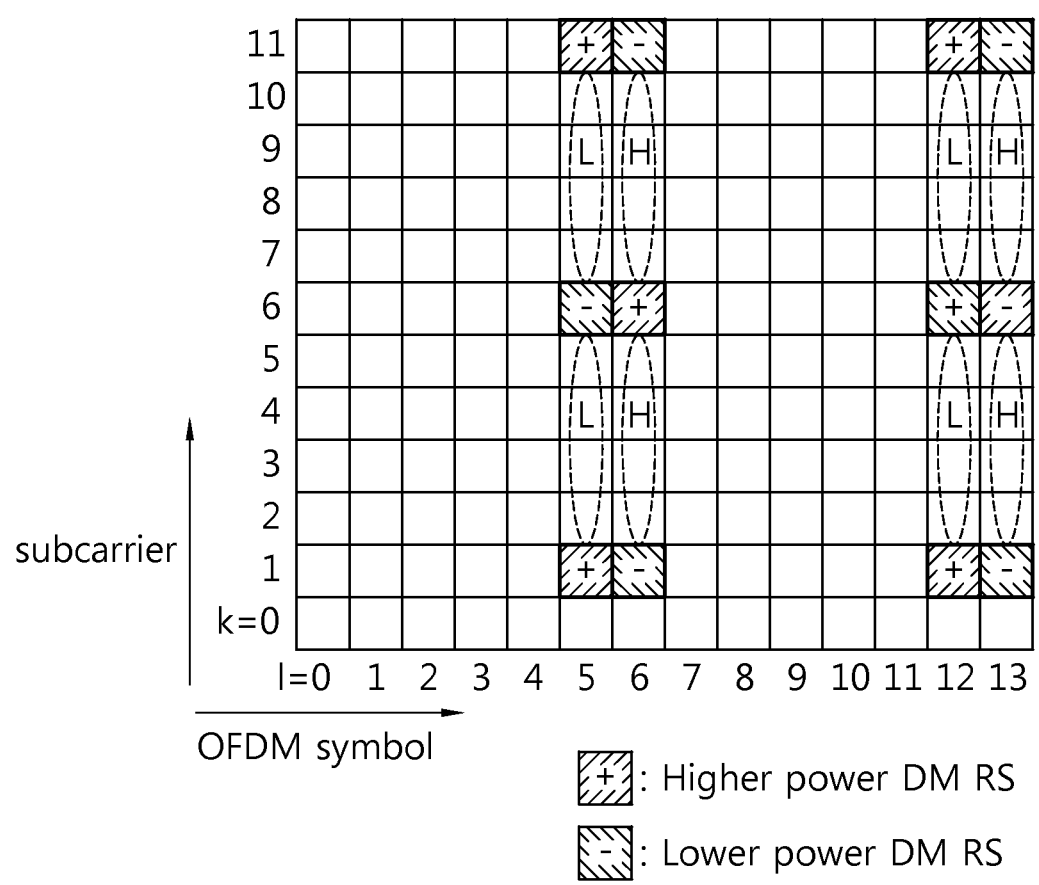
FIG. 22 shows a power deterioration caused by a DM RS.

FIG. 22 shows a power deterioration caused by a DM RS.

Due to high transmission power of the DM RS, transmission power of the remaining REs in a corresponding OFDM symbol may be relatively decreased.

For example, assume that transmission power of a DM RS RE of OFDM symbols l=5, 12 is high, and a DM RS RE of OFDM symbols l=6, 13 is relatively low. Therefore, there is no choice but to allocate lower transmission power than OFDM symbols with l=6, 13 to a control channel to which the remaining REs of the OFDM symbols with l=5, 12 are mapped. Great power is allocated to the DM RS, and power cannot be sufficiently allocated to the control channel. Therefore, correct monitoring of the control channel may be difficult.

For this, it is proposed to regulate transmission power for each RE by applying spreading (or orthogonal covering) to the control channel.

If it is assumed that [1, −1] is expressed by [+, −], the number of '+'s and the number of '−'s may be equally or similarly maintained in the same OFDM symbol.

Figure 23:
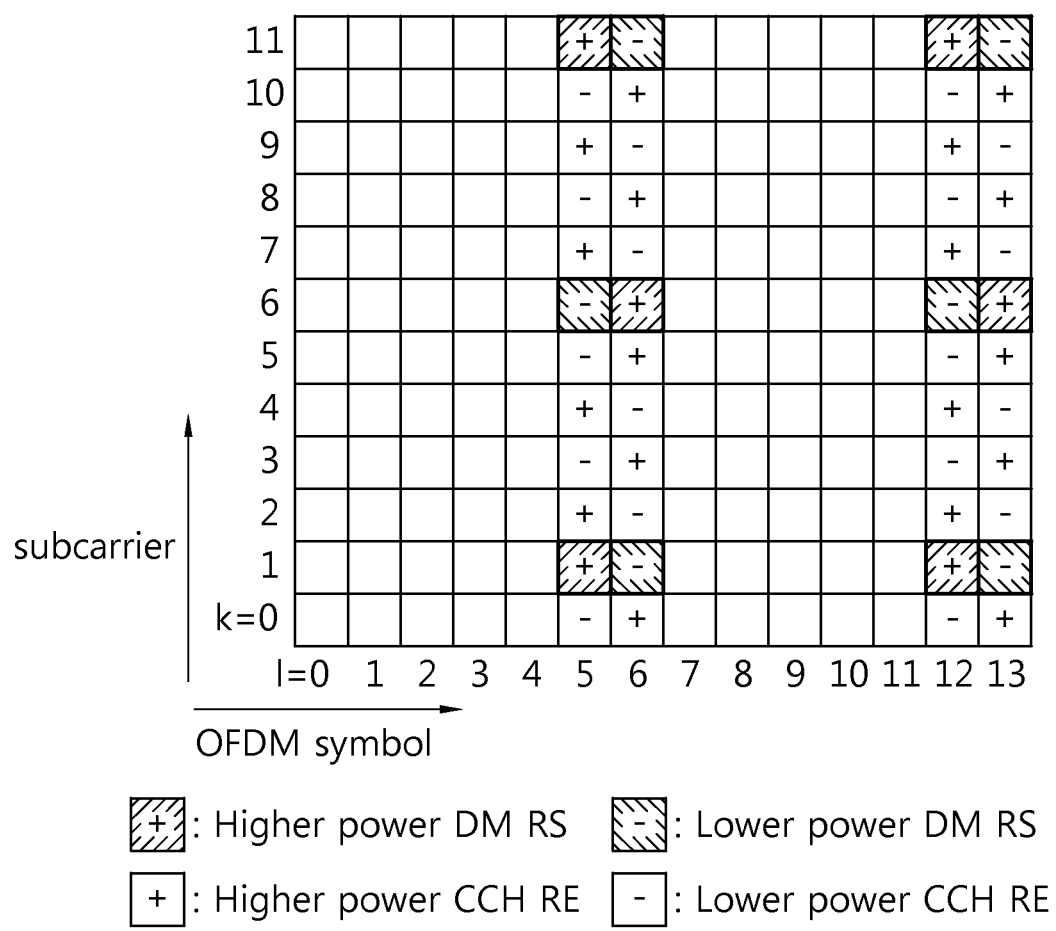
FIG. 23 shows an example of spreading a control channel for a DM RS which uses an antenna port.

FIG. 23 shows an example of spreading a control channel for a DM RS which uses an antenna port.

One RS OFDM symbol has a DM RS RE and a control channel RE, and 1 and −1 are equally distributed by 6 REs across 12 REs in total. Therefore, a power shortage problem in a specific OFDM symbol may be solved.

According to a power distribution, 'DM RS RE: control channel RE' may be designed by a wide margin such as 7:7, not 6:6.

Figure 24:
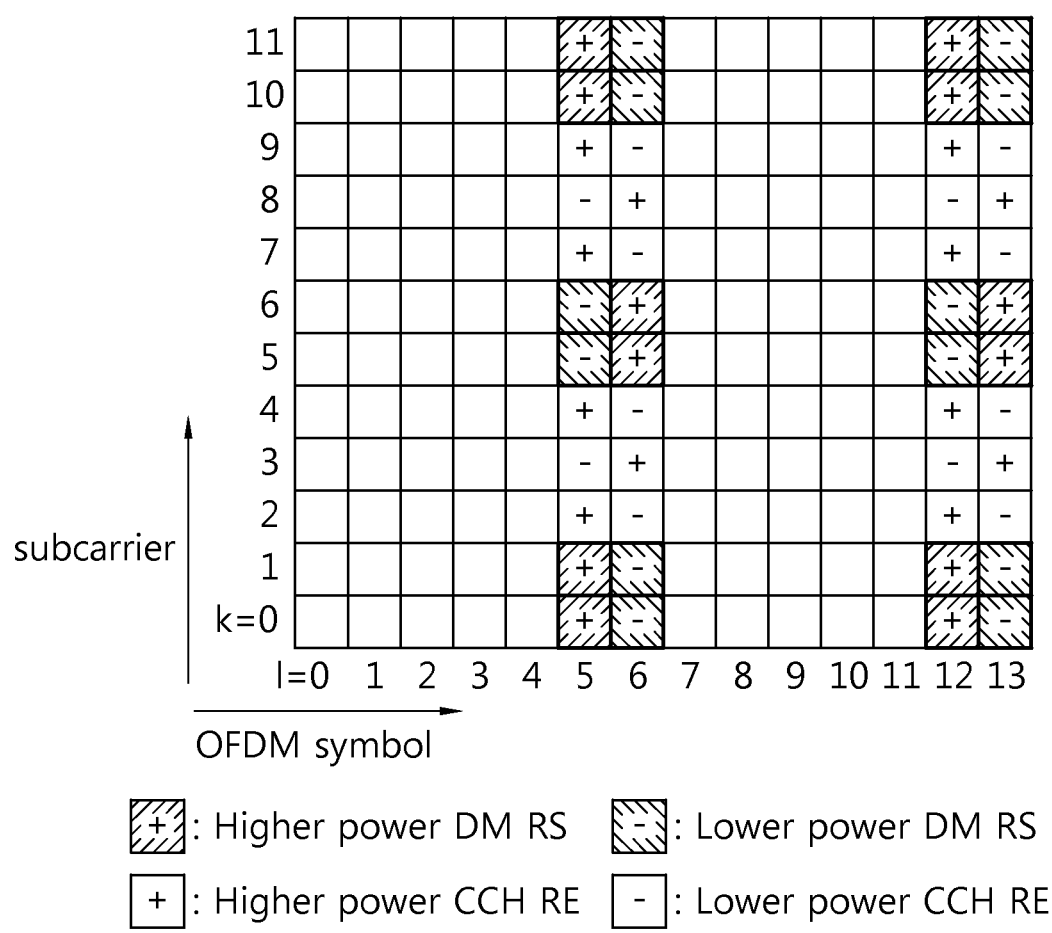
FIG. 24 and FIG. 25 show examples of spreading a control channel for a DM RS which uses 4 antenna ports.
Figure 25:
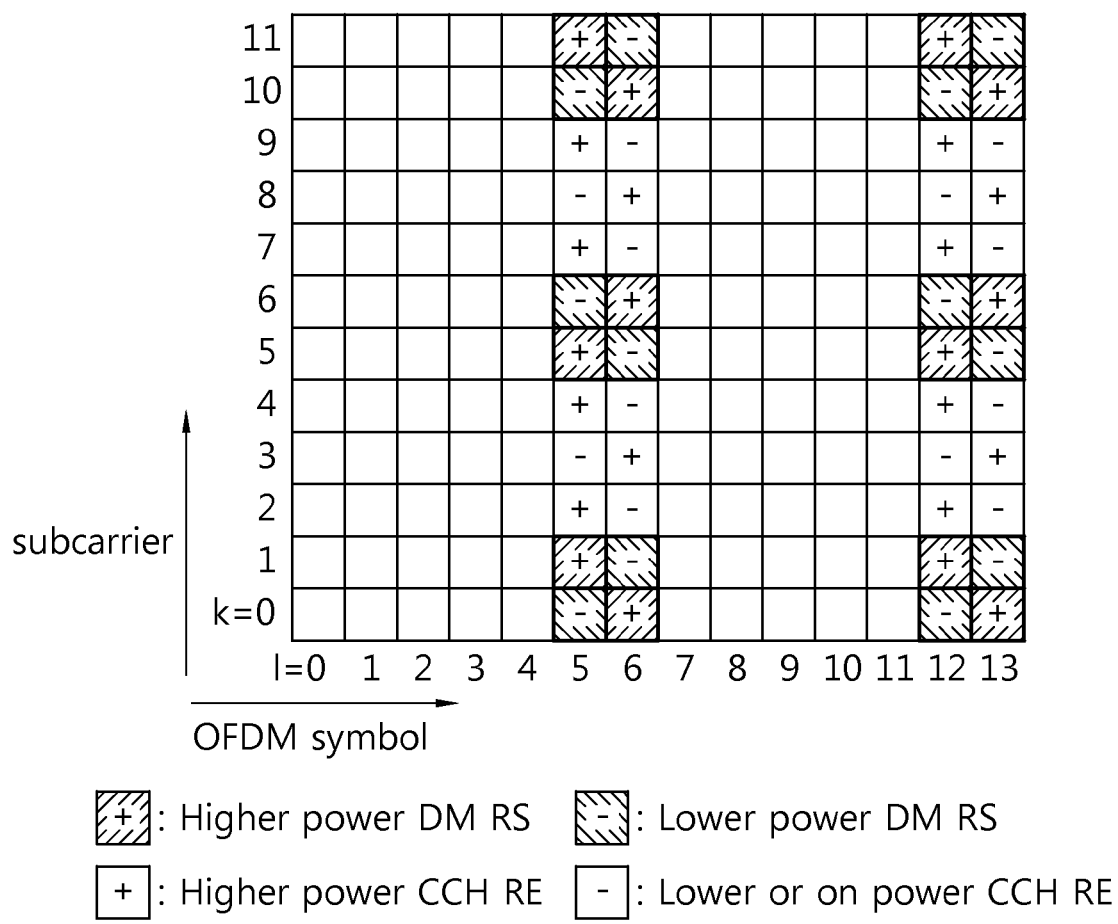

FIG. 24 and FIG. 25 show examples of spreading a control channel for a DM RS which uses 4 antenna ports. Since the spreading of the DM RS varies, various types of spreading may be applied to regulate transmission power of the control channel.

As another embodiment for solving a shortage of the transmission power, a control channel (CCH) may not be mapped to a specific RE, and the transmission power may be set to zero.

Figure 26:
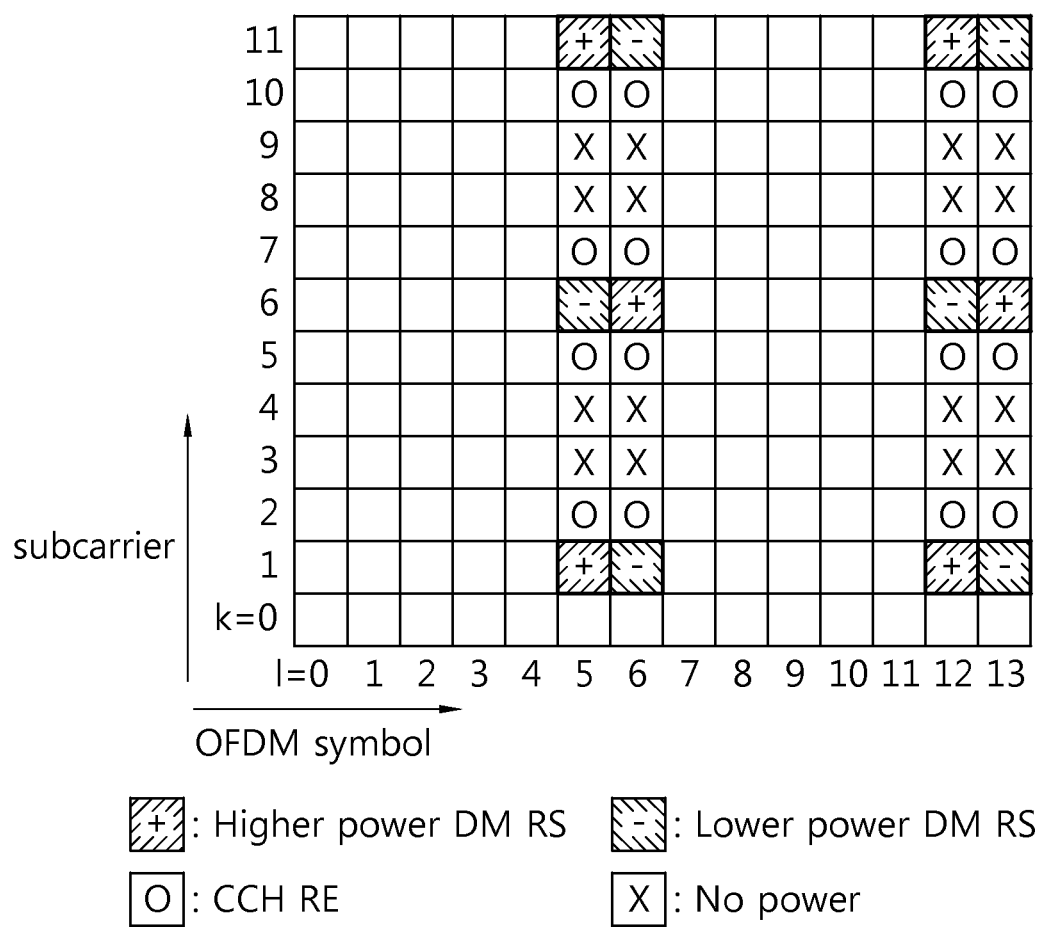
FIG. 26, FIG. 27, and FIG. 28 show other examples of spreading a control channel for a DM RS.
Figure 27:
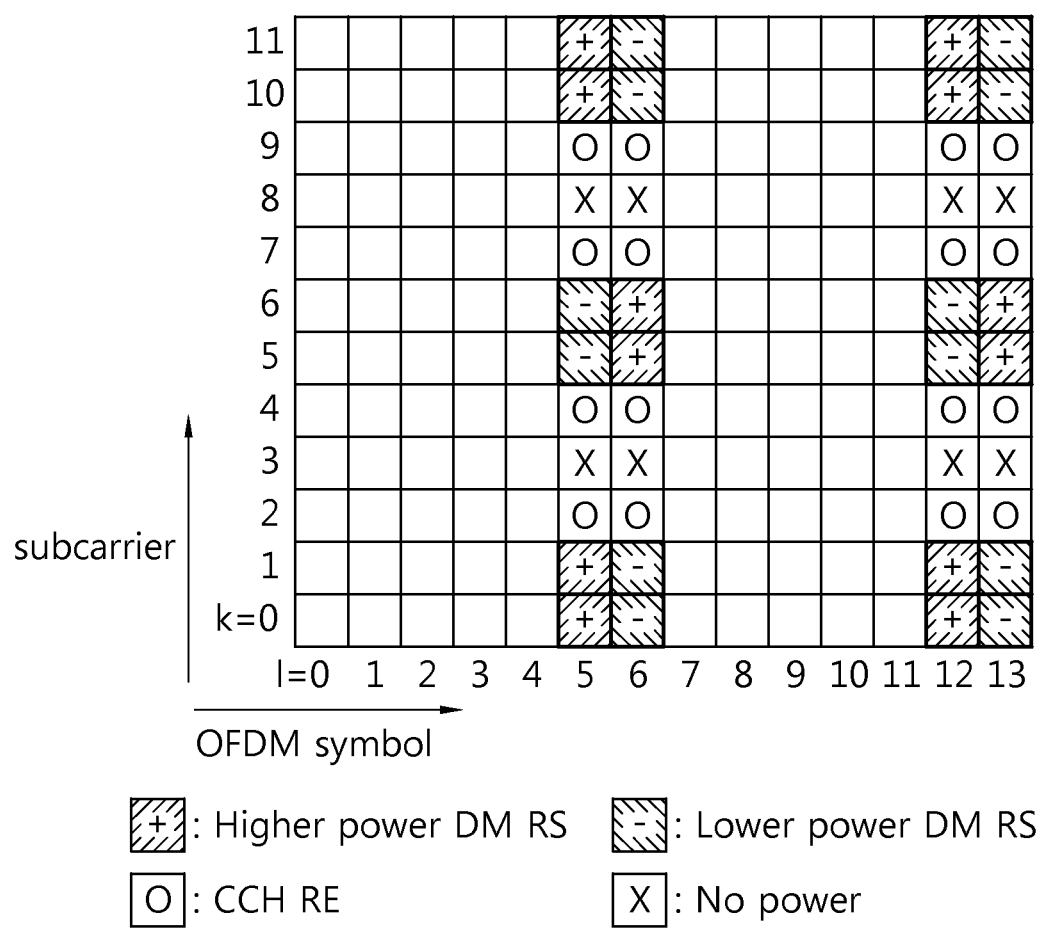
Figure 28:
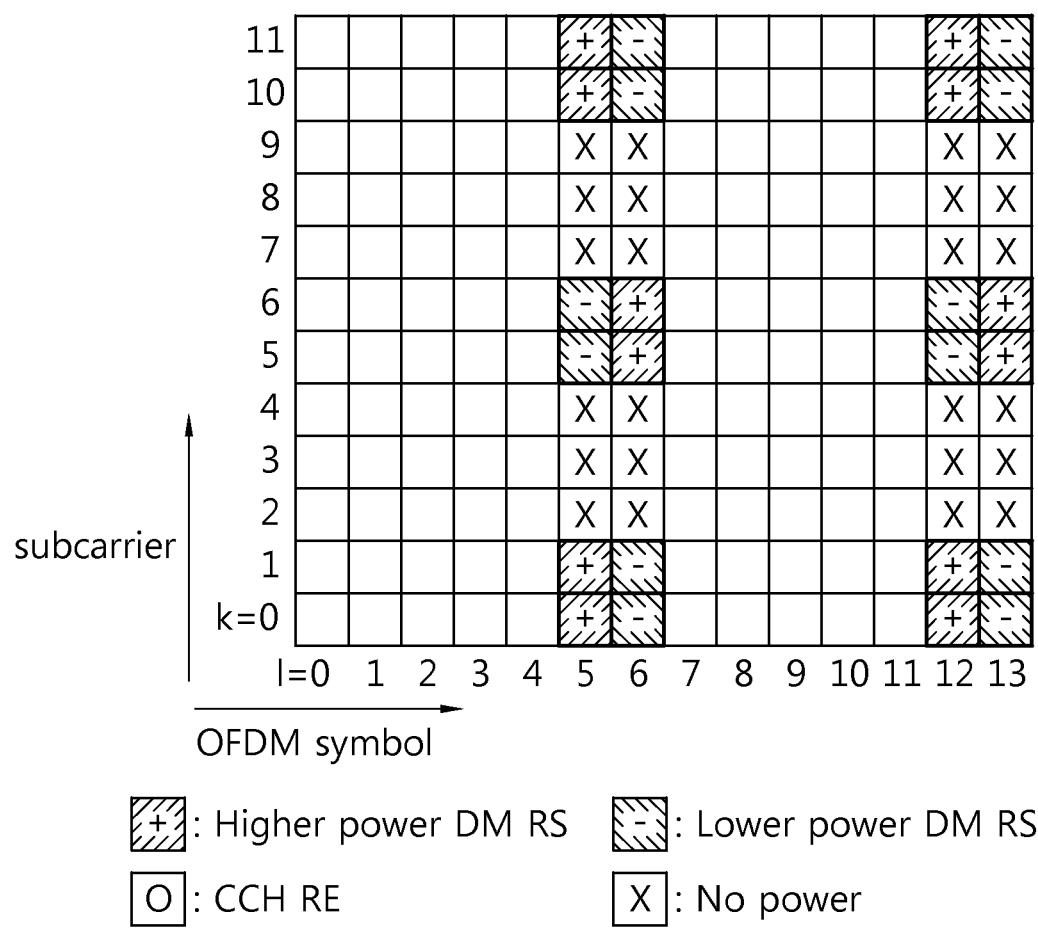

FIG. 26, FIG. 27, and FIG. 28 show other examples of spreading a control channel for a DM RS.

Some of 4 REs which exist between DM RSs in one RS OFDM symbol are not used. The unused REs are REs located far from the DM RS. That is, REs of which a channel estimation error can be increased are not used as much as possible. Alternatively, as shown in FIG. 28, all of the remaining REs other than a DM RS RE may not be used.

Figure 29:
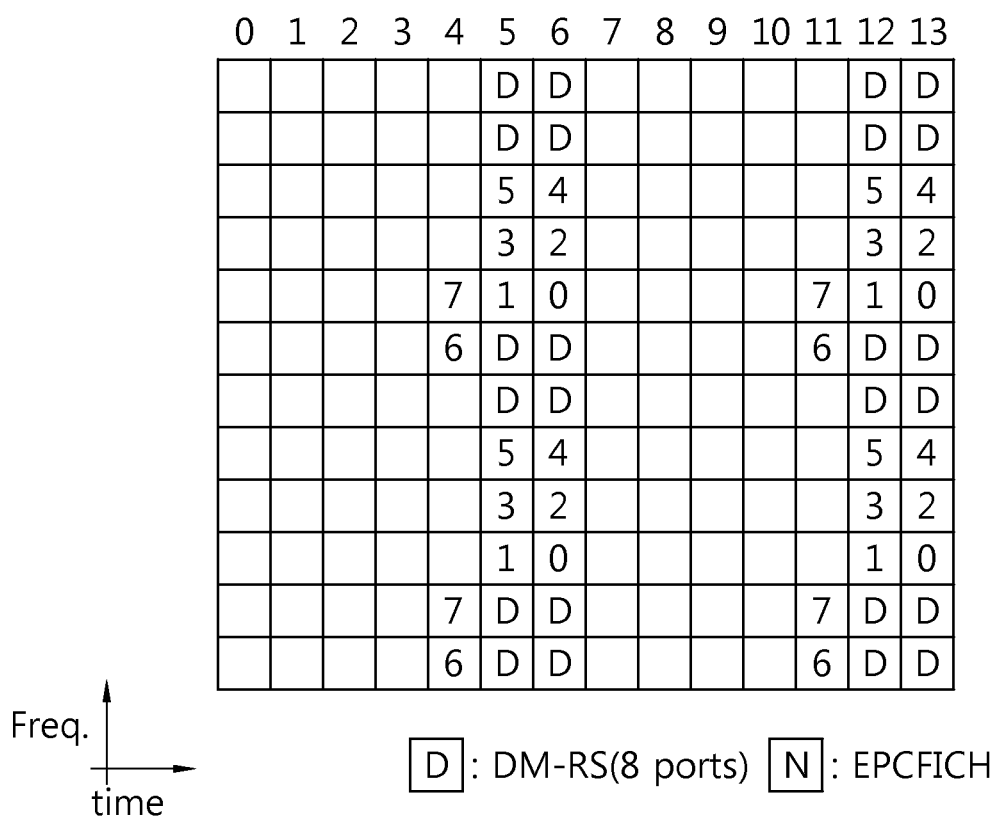
FIG. 29 and FIG. 30 show various examples of EPCFICH mapping.
Figure 30:
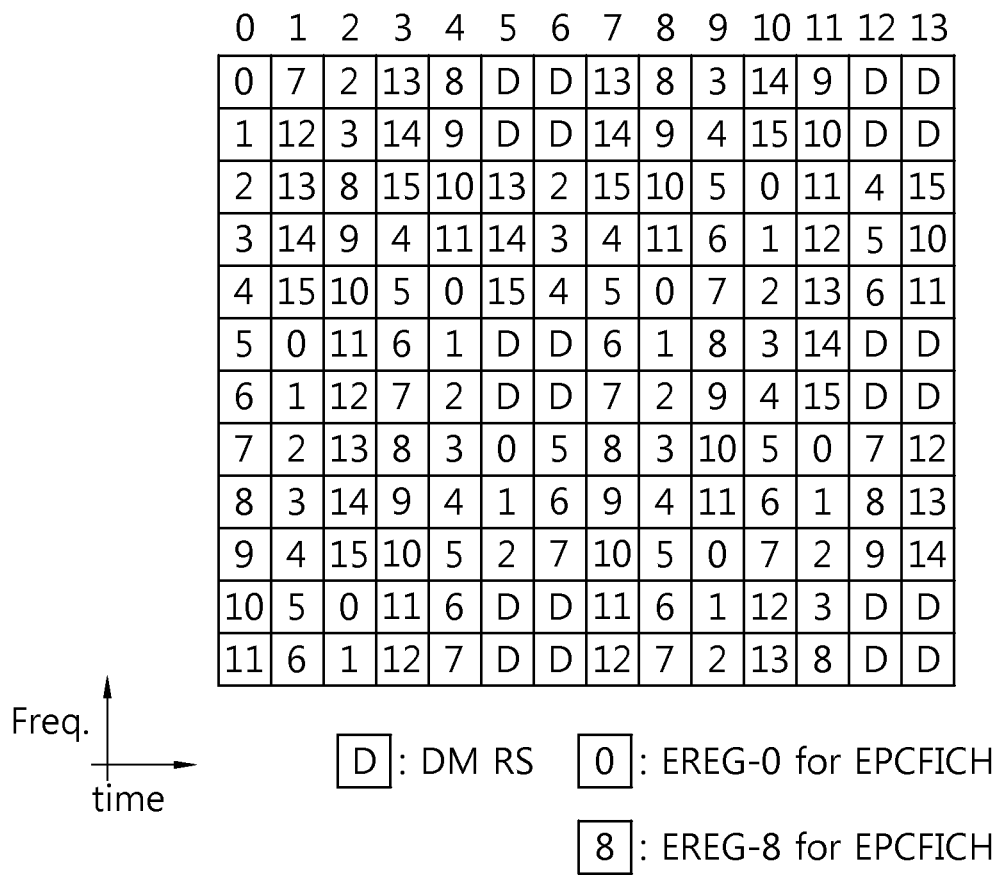

FIG. 29 and FIG. 30 show various examples of EPCFICH mapping.

Figure 31:
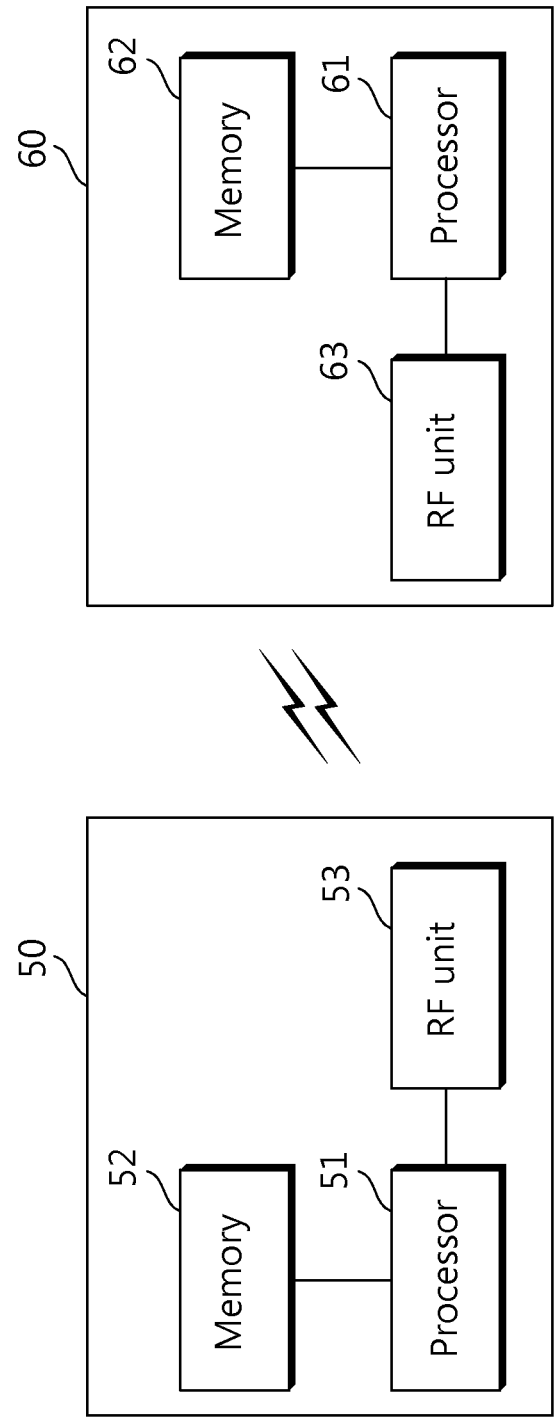
FIG. 31 is a block diagram showing a wireless communication system according to an embodiment of the present invention.

FIG. 31 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the aforementioned embodiment, an operation of the BS may be implemented by the processor 51. The processor 51 may configure a search space for an EPDCCH and/or an EPCFICH, and may transmit the EPDCCH and the EPCFICH.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the aforementioned embodiment, an operation of the wireless device may be implemented by the processor 61. The processor 61 may monitor an EPDDCH and an EPCFICH in a search space.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for monitoring a control channel in a wireless communication system, the method comprising:

receiving, by a wireless device, indication information for indicating a search space for a downlink control channel on an indication channel; and monitoring, by the wireless device, the downlink control channel in the search space, wherein the search space is defined by a physical resource block (PRB) pair, wherein a resource region in which the indication channel is received and the search space are located in a same subframe, wherein the PRB pair contains N enhanced control channel elements (ECCEs), where N>=1, wherein the downlink control channel is monitored in M ECCEs among the N ECCEs, where M<N, and wherein the indication channel is monitored in ECCEs among the N ECCEs other than the M ECCEs.

2. The method of claim 1, wherein the resource region in which the indication channel is received is fixed in the subframe.

3. The method of claim 1, wherein the resource region in which the indication channel is received partially or entirely overlaps with the search space.

4. The method of claim 1, wherein the indication information indicates any one of the number of PRB pairs and a position of the PRB pair.

5. A wireless device for monitoring a control channel in a wireless communication system, the wireless device comprising:

a radio frequency (RF) unit configured to transmit and receive a radio signal; and a processor operatively coupled to the RF unit and configured to:

receive indication information for indicating a search space for a downlink control channel on an indication channel; and monitor the downlink control channel in the search space, wherein the search space is defined by a physical resource block (PRB) pair, wherein a resource region in which the indication channel is received and the search space are located in a same subframe, wherein the PRB pair contains N enhanced control channel elements (ECCEs), where N>=1, wherein the downlink control channel is monitored in M ECCEs among the N ECCEs, where M<N, and wherein the indication channel is monitored in ECCEs among the N ECCEs other than the M ECCEs.

* * * * *